United States Patent
Espersen

(10) Patent No.: US 10,422,439 B2
(45) Date of Patent: Sep. 24, 2019

(54) MULTIFUNCTIONAL SANITARY VALVE AND METHOD OF OPERATING SUCH

(71) Applicant: KMATIC APS, Holstebro (DK)

(72) Inventor: Peter Espersen, Holstebro (DK)

(73) Assignee: Kmatic ApS, Holstebro (DK)

( * ) Notice: Subject to any disclaimer, the term of this patent is extended or adjusted under 35 U.S.C. 154(b) by 0 days.

(21) Appl. No.: 15/774,880

(22) PCT Filed: Nov. 8, 2016

(86) PCT No.: PCT/DK2016/050358
§ 371 (c)(1),
(2) Date: May 9, 2018

(87) PCT Pub. No.: WO2017/080561
PCT Pub. Date: May 18, 2017

(65) Prior Publication Data
US 2018/0292021 A1   Oct. 11, 2018

(30) Foreign Application Priority Data

Nov. 9, 2015 (DK) ................................ 2015 70720

(51) Int. Cl.
*F16K 31/122* (2006.01)
*F16K 11/22* (2006.01)
(Continued)

(52) U.S. Cl.
CPC ........ *F16K 31/1225* (2013.01); *F15B 11/036* (2013.01); *F15B 15/1409* (2013.01); *F15B 21/06* (2013.01); *F16K 11/22* (2013.01)

(58) Field of Classification Search
CPC .. F16K 31/1225; F16K 11/22; F15B 15/1409; F15B 11/036; F15B 21/06
See application file for complete search history.

(56) References Cited

U.S. PATENT DOCUMENTS 3,868,970 A   3/1975   Ayers et al.
6,186,163 B1   2/2001   Borg
(Continued)

FOREIGN PATENT DOCUMENTS

CN   201428835   3/2010
CN   201575226   9/2010
(Continued)

OTHER PUBLICATIONS

English Abstract of NL 1034663.
(Continued)

*Primary Examiner* — Umashankar Venkatesan
(74) *Attorney, Agent, or Firm* — Dykema Gossett PLLC

(57) ABSTRACT

A sanitary valve system (10) comprising an actuator arrangement (20) in an actuator housing (32) comprising a first piston chamber (30I) with a first piston (32I) separating the first piston chamber in a first upper cavity (34IU) and a first lower cavity (34IL) and having a first piston shaft (36I) configured to operate outside of the actuator housing. The valve system is configured to operate in multiple states. The operation of each state and transitions amongst states including identical states are controlled by regulating the liquid pressure or flow in each respective first and second upper and lower cavities. The regulation of liquid may be via a common distribution plate arrangement (90). The distribution arrangement may be with least one common distribution plate (92) with a set of canals (94) configured to connect at least one set of upper and lower regulation lines (82IU, 82IL,82IIU, 82IIL) with the respective first and second upper and communication lines (50IU, 50IL, 50IIU, 50I IL). A sanitary valve kit and a method of retrofitting an existing valve arrangement are also disclosed.

24 Claims, 16 Drawing Sheets

(51) Int. Cl.
*F15B 11/036* (2006.01)
*F15B 15/14* (2006.01)
*F15B 21/06* (2006.01)

(56) References Cited

U.S. PATENT DOCUMENTS

| | | | |
|---|---|---|---|
| 6,343,537 B1 * | 2/2002 | Iida | F15B 11/123 92/13.1 |
| 6,367,856 B1 * | 4/2002 | Jasperse | B25J 9/144 294/116 |
| 6,782,910 B2 | 8/2004 | Mondani et al. | |
| 8,915,480 B2 * | 12/2014 | Jakobsen | F15B 21/06 251/30.02 |
| 2004/0056225 A1 * | 3/2004 | Novo | B29C 45/281 251/63.6 |
| 2011/0309282 A1 | 12/2011 | Wiedenmann et al. | |
| 2013/0015377 A1 * | 1/2013 | Gamache | F16K 31/126 251/12 |
| 2014/0311600 A1 | 10/2014 | Burmester | |

FOREIGN PATENT DOCUMENTS

| | | | |
|---|---|---|---|
| CN | 101737524 | 6/2011 | |
| CN | 102297272 | 12/2011 | |
| CN | 202188162 | 4/2012 | |
| CN | 103672021 | 3/2014 | |
| CN | 203614805 | 5/2014 | |
| CN | 204328080 | 5/2015 | |
| CN | 108758020 * | 11/2018 | F16K 11/22 |
| DE | 102011088678 | 6/2013 | |
| EP | 0129665 | 1/1985 | |
| EP | 0898100 | 2/1999 | |
| GB | 701963 | 1/1954 | |
| NL | 1034663 | 4/2009 | |

OTHER PUBLICATIONS

English Abstract of EP 0898100.
English Abstract of DE 102011088678.
English Abstract of CN 201428835.
English Abstract of CN 201575226.
English Abstract of CN 103672021.
English Abstract of CN 203614805.
English Abstract of CN 102297272.
English Abstract of CN 101737524.
English Abstract of CN 204328080.
English Abstract of CN 202188162.
EPO, Supplementary European Search Report, issued in counterpart application No. EP 16863708 dated Jun. 11, 2019.

* cited by examiner

MULTIFUNCTIONAL SANITARY VALVE AND METHOD OF OPERATING SUCH

FIELD OF THE INVENTION

The invention relates to sanitary valve system comprising an actuator arrangement in an actuator housing comprising a first piston chamber with a first piston separating the first piston chamber in a first upper cavity and a first lower cavity and having a first piston shaft configured to operate outside of the actuator housing. The valve system is configured to operate in multiple states. The operation of each state and transitions amongst states including identical states are controlled by regulating the liquid pressure or flow in each respective first and second upper and lower cavities. The regulation of liquid may be via a common distribution plate arrangement. The distribution arrangement may be with least one common distribution plate with a set of canals configured to connect at least one set of upper and lower regulation lines with the respective first and second upper and communication lines.

BACKGROUND OF THE INVENTION

Valve systems and in particular sanitary or hygienic valve systems are important industrial systems that are under constant development. Such valve systems take up space in production settings and there is a need for smaller valves.

At the same time there is a need for increased functionality of valve systems.

Process valves for regulating processes need finer or more precise controls to handle certain volumes, flows or pressures at certain standards or tolerances.

Known solutions requires space to accommodate multiple functionality to handle the before mentioned flows.

The complexity is even further increased when handling two or more flows or volumes to be mixed.

Such increased complexity naturally increases the risk of malfunction during operation and increases the level of complexity during maintenance and repairs.

In food, drug or pharmaceutical applications or clean environment settings the need for reducing risk of spillage or unintended discharges is a further complication.

WO2009039856A1 describes a valve actuator system and a system for operation of valves, which valve comprises a valve housing, which valve housing comprises at least one inlet and at least one outlet, which valve housing further comprises a valve closing element, which valve element is mechanical connected to a valve actuator, which valve actuator comprises at least one piston, which piston is moved in a housing by a pressurised fluid in at least one direction, which valve actuator is connected to a control valve which control valve regulates a flow of a liquid medium from a pressure source to a first cavity chamber in the hosing of the valve actuator where the valve is a sanitary valve primarily for regulation of a flow of fluid food, which valve actuator is activated by a liquid medium.

OBJECT OF THE INVENTION

It is an objective of the invention to improve one or more of the outlined problems.

DESCRIPTION OF THE INVENTION

An object is achieved by a sanitary valve system comprising an actuator arrangement in an actuator housing comprising a first piston chamber with a first piston separating the first piston chamber in a first upper cavity and a first lower cavity and having a first piston shaft configured to operate outside of the actuator housing.

The valve system may comprise a second piston chamber with a second piston separating the second piston chamber in a second upper cavity and a second lower cavity and having a second piston shaft configured to operate outside of the actuator housing. The operation is of respective first and second upper and lower liquid communication lines communicating an incompressible liquid in respective first and second upper and lower cavities for moving or locking the respective first and second pistons.

The respective first and second pistons may be interconnected and independently operable.

The valve system comprises a valve arrangement comprising a first valve operably connected to the first piston shaft and a second valve operably connected to the second piston shaft.

The valve system comprises at least one liquid regulator arrangement configured to regulate pressure or flow of the incompressible liquid in at least one set of upper and lower regulation lines communicating with the respective first and second upper and lower cavities via the respective first and second upper and lower communication lines.

The valve system is configured to operate in multiple states. Thus the valve system is a multifunctional valve system that can operate in a first state where each respective first and second pistons are operated independently of each other according to respective first and second functions.

The valve system may also operate in a second state where the first and second pistons are operated jointly according to a joint function.

The operation of each state and transitions amongst states including identical states are controlled by regulating the liquid pressure or flow in each respective first and second upper and lower cavities. The regulation of liquid may be via a common distribution plate arrangement. The distribution arrangement may be with least one common distribution plate with a set of canals configured to connect at least one set of upper and lower regulation lines with the respective first and second upper and communication lines.

It is understood that the sanitary valve system may be a hygienic valve system, where the parts are according to a particular field of use such as regulation of a flow of fluid food (dairy, brewery, wine and soft drinks), fluid chemicals or fluid pharmaceuticals.

Especially for sanitary valves it is very important that no kind of contamination, such as chemicals or bacteria, is to be found in a factory or industrial setting where the valves operate. This is achieved when working with a liquid medium, as the medium is not in contact with the atmosphere. If by accident, the liquid medium gets into contact with fluid food, the liquid medium can be kept chemical and neutral and be sterilised in the closed circulating system so that bacteria never will occur in the liquid.

The incompressible medium may comprise mostly water. Clean water is a preferred liquid for hydraulics and water is mainly incompressible in relation to most other liquids, and water is the most inexpensive existing hydraulic medium. Furthermore an accidental spillage of drops of water may not impact the industrial environment and there is essentially no risk of destroying the products, as no actual contamination takes place.

Other liquids may be used depending on the industry, and liquids that easily evaporate may further reduce the risk or the spread of contamination.

The liquid may also be under pressure. The pressure of the liquid media may be below 50 Bar. The actual pressure may be selected according to the force that is needed in order to activate a valve. Typically a sufficient force is achieved at a relatively low pressure. Ranges of pressures for valve hydraulics are in the area of 20 Bar to 30 Bar.

The double actuator arrangements with the respective first and second pistons being interconnected allow for a great reduction in space and make the two pistons operate independently. Thus the two valves may be operated independently.

The valves may be in a valve housing, which may have respective first and second inlets and first outlets. The flow in each inlet and outlet may be controlled by a valve closing element.

The arrangement allows for the valve to operate in multiple states or modes of operation and thus function as a multifunctional valve.

One state may be a first state where the respective first and second piston are operated independently of each other according to respective first and second functions.

The respective first and second functions may be according to a logic implemented in a computer program or a controller.

The functions may be adjusted from an ideal functionality by an additional layer determined by a calibration routine or a calibration table.

There may be a second state where the first and second pistons are operated jointly according to a joint function. In this case, the joint function will simultaneously regulate the incompressible liquid in the cavities and thus result in the valves being regulated jointly via the pistons. This may be particularly useful when controlling flows proportionally or according to any other predefined mixing ratio.

Each state or both states are controlled by regulating the liquid pressure or flow in each respective first and second upper and lower cavities.

The above-mentioned regulation of states may also include transitions amongst states so that the valve can change from one state or one function to another state or function.

The regulation of fluid condition in the cavities may be via a common distribution plate arrangement with at least one common distribution plate with a set of canals configured to connect at least one set of upper and lower regulation lines with the respective first and second upper communication lines.

Thereby it is achieved that multiple modes of operation with the required complexity and number of communication lines and regulation lines are located or regulated via a single arrangement thus reducing the requirement of piping or complex piping.

Furthermore the plate allows identical or near identical sealing of the canals in the plate and places the sealings to one location, which greatly reduces time and resources to locate the source of a potential spill and allows for easy maintenance or change of sealings.

The canals may also be formed differently to impact the operations of the pistons. There may be one set of canals operating one piston and another set of canals operating another piston. The canals may be formed with different widths to yield different pressure differentials during operation. This may be for respective systems of regulation of respective cavities, and it may be regulation of respective cavities by a common regulation system where, all things being equal, only the respective sets of canals differ.

In an embodiment, the sanitary valve system may further comprise a third state where the respective first and second pistons are independently locked in respective first and second piston positions. There may also be a fourth state where the first and second pistons are dependently locked in respective first and second piston positions.

Again transitions may be amongst the states.

The operation or states of locking may be achieved by blocking the communication lines between the upper and lower cavities of the respective first and second pistons.

Such blocking may be in the liquid regulator arrangement or in the distribution plate.

Blocking in the regulator arrangement may be controlled as previously described whereas blocking of canals or leaving out canals in the distribution plate may result in a "hard wired" locking.

In an embodiment, the sets of canals are formed and arranged to communicate with regulation lines embedded in an actuator housing block.

This further reduces the size of the actuator and reduces the need for piping or complex piping. One advantage may also be that the actuator housing block is oversized for the piping and thus gives a strong set of canals in a space that was already there.

The block may be directly accessible from the outside of the valve system and configured to tighten the distribution plate to the actor housing.

The sanitary valve system may comprise multiple distribution plates each plate with a set of canals and arranged so that a set of canals in one distribution plate is in liquid communication with a set of canals in another distribution plate via an actuator housing block, and with one distribution plate essentially perpendicular to another regulation plate.

Such multiple distribution plates may allow for resolving otherwise complex or space-consuming piping. A further advantage is that two plates allow to change direction of the canals thus enabling or increasing design flexibility regulation lines that may be provided or substantially provided in the direction of the piston shafts, or from the outside, and be connected to a first distribution plate that essentially distributes the canals in a cross-section in the shaft direction and from there to a second distribution plate that essentially distributes the canals in a longitudinal or parallel direction of the shafts.

The two distribution plates may be interfaced or interconnected by one or more actuator blocks with canals.

In an embodiment, the valve system may a have plurality of sets of canals. The plurality of plates may be a plurality of regulator plates. Alternatively a single regulator plate can be adapted to be mounted in different positions, each different position corresponding to a distinctive set of canals and where at least one canal in one set of canals has a different form or is blocked compared to another set of canals. Hence a single regulator plate may have one set of active canals when located in one position and another set in another position.

Such different sets of canals may have different shapes to provide different pressures or flow distributions to respective first and second piston chambers.

The valve system may comprise a visual indicator arranged visually on the sanitary valve system and configured to display distinct colours according to the actual state of operation and/or transition between states.

Such visual representation is a great advantage and eases monitoring or inspection of operation. First of all, the multi-functionality of the valve system results in multiple statuses of operation and transitions between the states along with possible faults or malfunction. Secondly, having multiple in cases hundreds of valve systems operating in one industrial setting easily allows for detection operation state and/or to locate potential faults or malfunctions.

Visual representation colour codes may be per design or by industrial codex.

The colour coding may easily span a range of colour temperatures by using LED strips.

In a particular embodiment, sensors for input to the visual representation are placed at the distribution plate or in the canals in the distribution plate, which reduces wiring in the valve system.

In an embodiment of the sanitary valve system, the first and second pistons share a cavity, so that the first lower cavity and the second upper cavity is the same cavity i.e. the same or common cavity.

This embodiment reduces the need for one liquid or fluid line. The embodiment further reduces the length of the actuator by enabling two pistons to engage.

The embodiment may still operate in multiple states as outlined. Likewise the transitions may be accomplished. The control functions or algorithms may be different from the previous logic. In particular, liquid or fluid conditions in the common cavity may be a function of the position and in particular the liquid or fluid condition in the respective first upper cavity, the second lower cavity or both.

In such case generating a pressure or flow differential by having canals that are relatively larger or smaller to each other may allow the interrelated piston movements to start in the right order. Such adjustment may be implemented in the distribution plate.

In an embodiment of the sanitary valve system, the regulator arrangement comprises at least one pressure source, or a first pressure source and a second pressure source, configured to pressurize the liquid in the respective upper and lower regulation lines. There may be a common reservoir configured to store the liquid where at least one pressure source and common reservoir are in liquid communication via the common distribution plate arrangement with respective first and second control valves. Such a control valve may be a directional valve. There may be a first position allowing liquid communication from the pressure source to upper regulation line and from lower regulation line to the common reservoir. There may be a second position blocking liquid communication between the pressure source and common reservoir and the upper and lower regulation lines. There may be a third position allowing liquid communication from the pressure source to lower regulation line and from upper regulation line to the common reservoir.

Each upper regulation line may be in liquid communication with the respective first and second upper communication lines and each lower regulation line may be in liquid communication with respective first and second lower communication lines via the common distribution plate arrangement.

The directional valve may be a 4/3 way type of valve. The three positions may correspond to respective first, second and third functions or flow directions.

In an embodiment there is a single common regulator arrangement connected to the distribution plate so that the respective cavities are connected.

In an alternative embodiment of the sanitary valve system the regulator arrangement comprises at least one pump, such as a gerotor type of pump. There may be common pump or respective first and second pumps configured to move liquid between upper and lower regulation lines.

In this embodiment each upper regulation line may be in liquid communication with the respective first and second upper communication lines and each lower regulation line in liquid communication with respective first and second lower communication lines in the common distribution plate arrangement.

In the embodiment with a pump based regulator arrangement, fluid may be moved between an upper and a lower cavity of respective first and seconds pistons to move the respective pistons.

A person skilled in the art will appreciate different combinations of the above-mentioned embodiments and be able to combine various aspects according to circumstances and needs.

An objective of the invention may also be achieved by a method of operating a sanitary valve system. The valve system may be as disclosed above or the valve system may be with a valve arrangement comprising a first and a second valve operably connected to respective first and second pistons operating in a actuator housing. The respective pistons may separate respective first and second piston chambers in an upper cavity and a lower cavity each with an incompressible liquid and with respective first and second upper and lower communication lines. The method may comprise action of regulating the position of pistons by changing the pressure or flow of the incompressible liquid in the respective upper and lower cavities or by moving incompressible liquid between the respective upper and lower cavities. There may be an action of locking the positions of pistons by blocking the respective upper and lower communication lines The actions of regulating and locking may be performed in and amongst multiple states. A state may be a first state where each respective first and second pistons are operated independently of each other according to respective first and second functions. A second state may be where the first and second pistons are operated jointly according to a joint function.

A method of operating a sanitary valve system may for the actions of regulating and locking be performed in and amongst further states of a third state where the respective first and second pistons are independently locked in respective first and second positions. There may also be a fourth state where first and second pistons are dependently locked in respective first and second positions.

A method of operating a sanitary valve system may be where the actions of regulating and locking the positions of the pistons are performed using a common distribution plate with a set of canals that connects respective first and second upper and lower communication lines with at least one set of upper and lower regulation lines.

A method of operating a sanitary valve system may be wherein the change of possible operational states, independent functions or joint functions are performed by changing one set of canals with another set of canals.

An object may be achieved by a sanitary valve kit that can modify an existing valve arrangement having a valve housing with a first and a second flow line. The first and second flow lines may be in communication via an opening or an aperture. The kit may be configured to operate with an actuator arrangement in multiple states. The actuator arrangement may be as outlined previously. The sanitary valve kit may comprise a first valve operably connected to the first piston shaft. There may be a second valve operably connected to the second piston shaft. The respective first and second piston shafts may be interconnected and independently operable. The first and second valves may be arranged relatively to each other and to be independently operable when assembled in the valve housing.

There may be a first housing seal with a first seal aperture adapted to allow guidance of the second piston shaft. There may be a second housing seal with a second seal aperture adapted to allow guidance of a first piston shaft extension.

Such kit has the benefit of allowing an existing valve housing to be used with a more advanced actuator than hereto. The advanced actuator may be multiple state actuator as outlined. The existing valve housing may be located in an existing matrix. Thus even more complex industrial configurations may be updated with the kit thereby allowing a more flexible control of valves.

The kit has the advantage of eliminating or reducing the need of the valve arrangement to be balanced. Thus the kit makes balancing unnecessary. The valves (the first and second) may thus be simple and take-up less volume.

In kit may be configured so that when assembled to operate in a first state where each respective first and second valves are operated independently of each other according to respective first and second functions.

In kit may be configured so that when assembled to operate in a second state where the first and second valves are operated jointly according to a joint function.

In an aspect the kit may be configured so that when assembled to operate in a third state where the respective first and second valves are independently locked in respective first and second valve positions; and in a fourth state where the respective first and second valves are dependently locked in respective first and second valve positions.

For one or more of the mentioned operations states, the first and second piston shafts of the kit may be configured to be connected to or be attached to the respective first and second shafts of the actuator as disclosed.

In an aspect the, at least one of the first or second valves has a valve seat with a conical shape.

In an aspect, the first and second piston shafts and the first piston shaft extension are arranged to operate coaxially.

In an aspect, the first piston shaft extension is without balancing means. In an aspect, the first valve seat is unbalanced. In an aspect, the second valve seat is unbalanced.

By unbalanced is understood that no additional balancing structures, weights, support is necessary thereby reducing the complexity and volume of the valves and seats as compared to a balanced arrangement.

In an aspect, both the first and second valve seats are unbalanced, and wherein the first piston shaft extension has a free end shape with a cross section complementary to the first seal aperture.

An objective may be achieved by a method of retrofitting an existing valve arrangement to operate with an actuator arrangement in multiple states. The method may comprise an act of establishing an existing valve arrangement with access to a valve housing. There may be an act of providing an actuator arrangement with the respective first and second pistons being interconnected and independently operable.

There may be an act of arranging in the valve housing a first valve operably connected to the first piston shaft and a second valve operably connected to the second piston shaft. There may be an act of sealing the valve housing by using a first and second seal plates.

Hence existing, and even complex matrices, of flow channels with valves can be upgraded to take advantage of the operational benefits and flexibility of the disclosed actuator.

DESCRIPTION OF THE DRAWING

Embodiments of the invention will be described in the figures, whereon.

DETAILED DESCRIPTION OF THE INVENTION

| No | Item |
|---|---|
| 10 | Sanitary valve system |
| 20 | Actuator arrangement |
| 22 | Actuator housing |
| 23 | Actuator Block/Actuator Part |
| 24 | Liquid connections |
| 24U | Upper, Lower Liquid connections |
| 24L | |
| 30 | Piston chamber |
| 32 | Piston |
| 34 | Cavity |
| 34U, 34L | Upper cavity |
| | Lower cavity |
| 36 | Piston shaft |
| 37 | Piston position |
| 50 | Liquid communication lines |
| CL | Communication Lines |
| 50U = CLU, | Upper Communication Lines |
| 50L = CLL, | Lower Communication Lines |
| 55 | Incompressible liquid |
| 70 | Valve arrangement |
| 72 | Valve |
| 75 | Flow line |
| 80 | Regulator arrangement |

-continued

| No | Item |
|---|---|
| 82 | Set of regulator lines |
| 82U | Upper set of regulator lines |
| 82L | Lower set of regulator lines |
| 83 | Pressure source |
| 84 | Common Reservoir |
| 85 | Control valve |
| 86 | Directional valve |
| 88 | Pump |
| 89 | Motor |
| 90 | Distribution plate arrangement |
| 92 | Distribution plate |
| 94 | Set of canals |
| 95 | Canal |
| 100 | State |
| 101 | First state |
| 102 | Second state |
| 103 | Third state |
| 104 | Fourth state |
| 105 | Transition |
| 106 | Self transition |
| 110 | Function |
| 112 | Joint function |
| 120 | Visual indicator |
| 200 | Method of operating sanitary valve system |
| 210 | Regulating |
| 220 | Locking |
| 1000 | Sanitary valve kit |
| 1036 | Piston shaft |
| 1040 | Piston shaft extension |
| 1070 | Valve arrangement |
| 1071 | Valve housing |
| 1072 | Valve |
| 1073 | Valve seat |
| 1075 | Flow line |
| 1077 | Flow line communication |
| 1078 | Housing seal |
| 1079 | Seal aperture |

Figure 1:
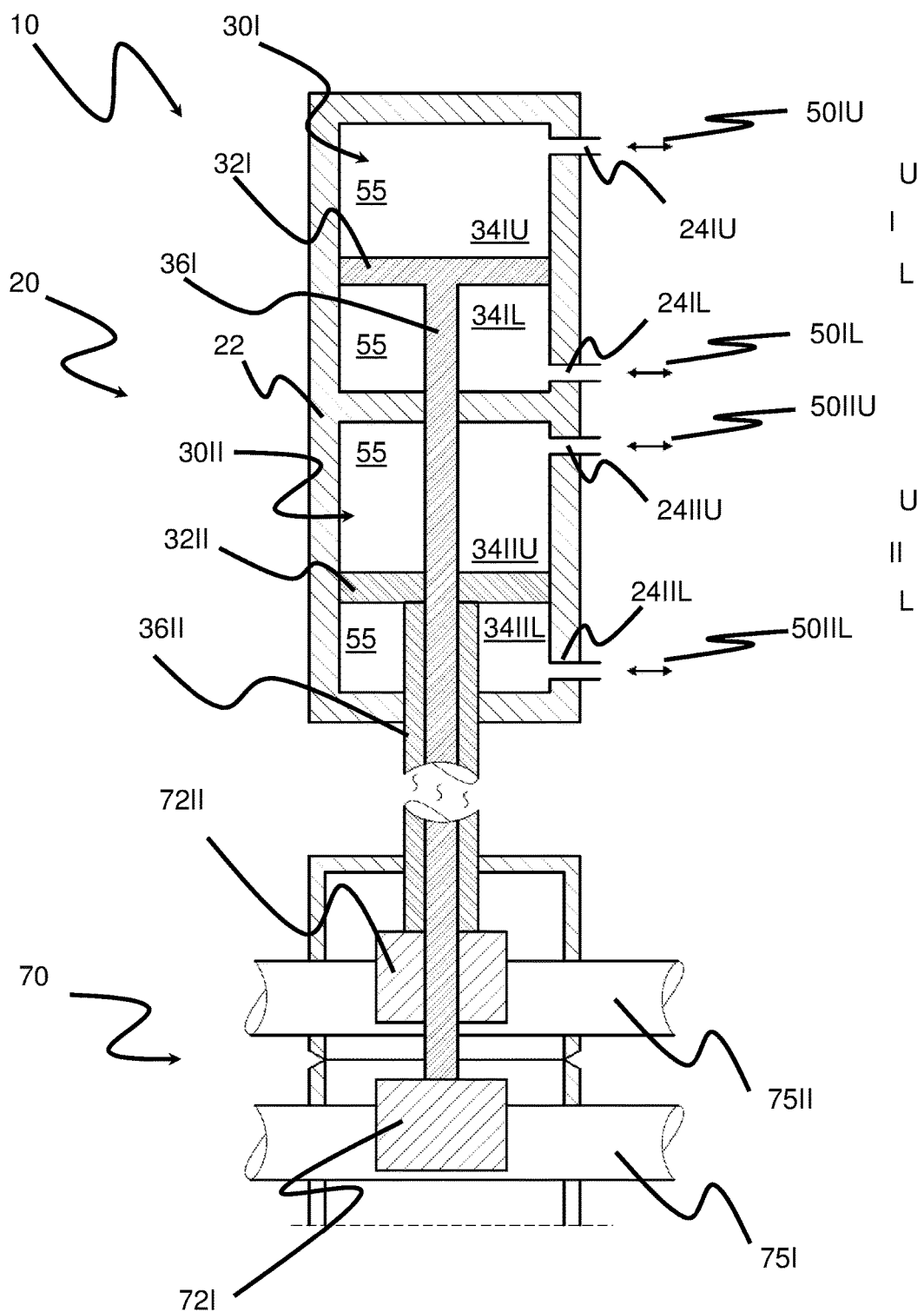
FIG. 1 illustrates a an dual actuator arrangement interacting with a dual valve arrangement.

FIG. 1 illustrates a dual actuator arrangement interacting with a dual valve arrangement. The figure shows a part of a sanitary valve system 10 comprising an actuator arrangement 20 in an actuator housing 32. The housing 32 has a first piston chamber 30I with a first piston 32I separating the first piston chamber 30I in a first upper cavity 34IU and a first lower cavity 34IL. The piston 32 has a first piston shaft 36I configured to operate outside of the actuator housing 22. The piston shaft 36 is connected to a first valve 72I operating in a valve arrangement 70 to control or regulate a first flow line 75I.

The dual actuator has a second piston chamber 30II with a second piston 32II separating the second piston chamber 30II in a second upper cavity 34IIU and a second lower cavity 34IIL. The second piston 32II has a second piston shaft 36II configured to operate outside of the actuator housing 22.

The second piston shaft 36II is connected to a second valve 72II operating in the valve arrangement 70 to control or regulate a second flow line 75II.

The two valves 72 are thus independently operable. In this particular embodiment the second piston shaft 36II is configured so that the first piston shaft 36I can be operated inside the second piston shaft 36II as seen.

There are provided respective first and second upper and lower liquid communication lines 50IU, 50IL, 50IIU, 50IIL communicating an incompressible liquid 55 to respective first and second upper and lower cavities 34IU, 34IL, 34IIU, 34IIL for moving or locking the respective first and second pistons 32I, 32II.

The respective first and second pistons 32I, 32II are thus interconnected and independently operable.

The valve arrangement 70 has a first valve 72I operably connected to the first piston shaft 36I and a second valve 72II operably connected to the second piston shaft 36II.

Figure 2:
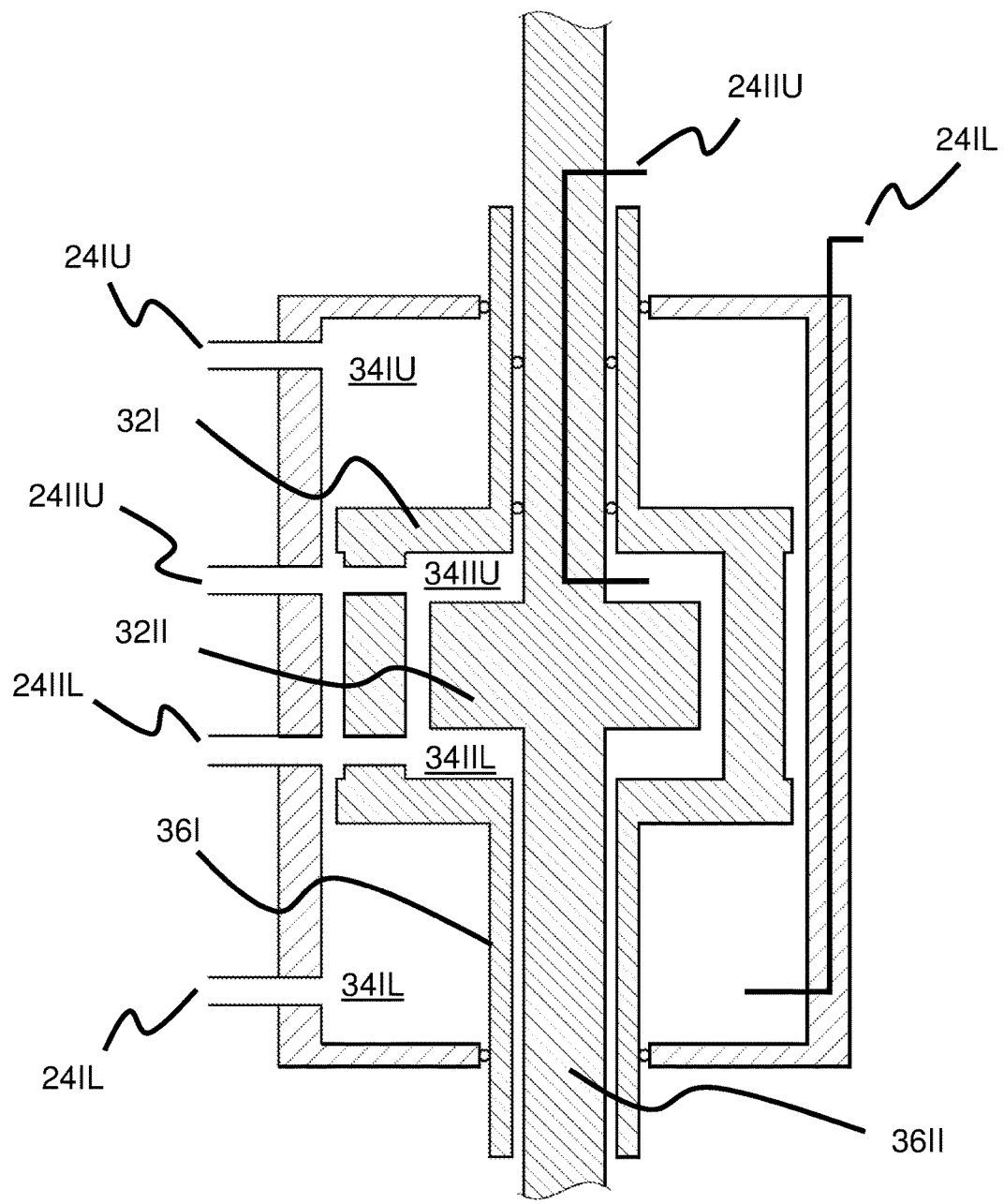
FIG. 2 illustrates an alternative embodiment of a dial actuator arrangement

FIG. 2 illustrates an alternative embodiment of a dial actuator arrangement.

The figure shows an alternative embodiment of the piston arrangement. The embodiment discloses a first piston 32I with an embedded piston chamber 30II for a second piston 32II. Thus the first piston 32I separates a piston chamber into first upper and lower cavities 34IU, 34IL. The second piston 32II separates a piston chamber into a second upper and lower cavities 34IIU, 34IIL, which second upper and lower cavities moves with the first piston 32I. The respective first and second upper and lower liquid connections 24 are schematically shown to the left.

The figure also illustrates an alternative wiring or piping of the second upper liquid connection 24IIU, which is seen to go via the second piston shaft 36II and into the second upper cavity 34IIU inside the actual first piston 32I.

The figure also illustrates an alternative wiring or piping of the first lower liquid connection 24IL, which is seen to go via the actuator housing 22 and into the first lower cavity 34IL.

Likewise the actual piping to the second lower cavity may be through the lower part of the piston shaft.

Thereby the first and second pistons 32I, 32II are interconnected and independently operable.

Figure 3:
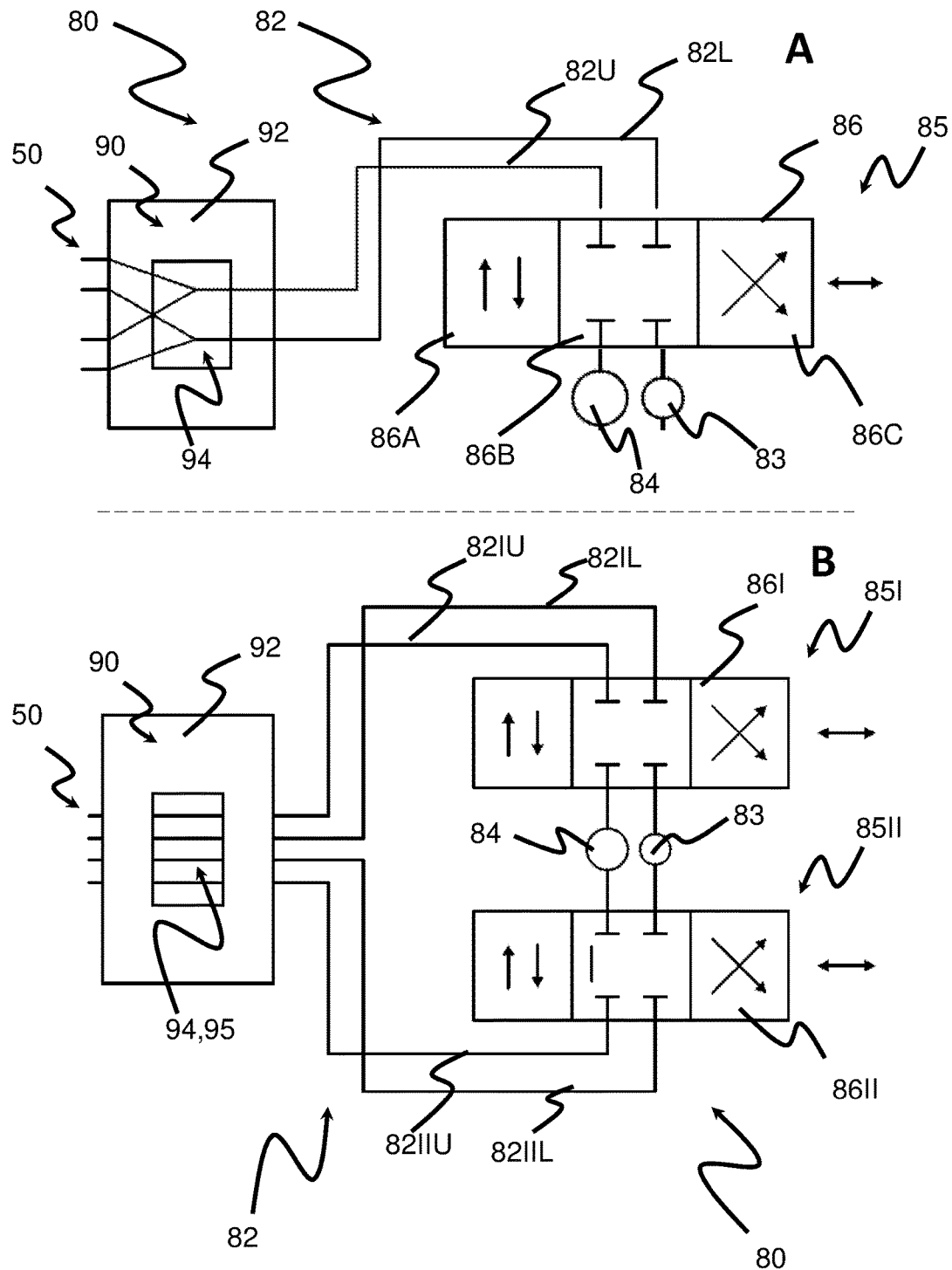
FIG. 3 illustrates embodiments of a control valve arrangement being a directional valve type of arrangement.

FIG. 3 illustrates embodiments of a regulator arrangement being a directional valve type of arrangement.

The regulator arrangement 80 is depicted in (A) as a single directional valve 86 arrangement and in (B) as a dual directional valve 86 arrangement with respective first and second directional valves 86I, 86I.

Figure A illustrates the regulator arrangement 80 with pressure source 83 configured to pressurize the liquid 55 (not shown) in the respective upper and lower regulation lines 82U, 82L. The reservoir 84 is configured to store the liquid 55.

The pressure source 83 and reservoir 84 are in liquid communication via the common distribution plate arrangement 90 with a control valve 85 being a directional valve 86. The directional valve 86 may be a 4/3-way type of valve.

The directional valve 86 has a first position 86A allowing liquid communication from the pressure source 83 to upper regulation line 82U and from the lower regulation line 82L to the reservoir 84.

The directional valve 86 has a second position 86B blocking liquid communication between the pressure source 83 and common reservoir 84 and the upper and lower regulation lines 82U, 82L.

The directional valve 86 has a third position 86C allowing liquid communication from the pressure source 83 to the lower regulation line 82L and from upper regulation line 82U to the common reservoir 84.

The upper regulation line 82U in liquid communication with the respective first and second upper communication lines 50IU, 50IIU. The lower regulation line 82L is in liquid communication with respective first and second lower communication lines 50IL, 50IIL via a distribution plate arrangement 90. The distribution plate arrangement 90 has a distribution plate 92 and a set of canals 94.

Figure B illustrates a dual regulator arrangement 80 with two control valves 85: A first and a second control valve 85I, 85II each being a directional valve 86.

The regulator arrangement 80 comprises at least one pressure source 83, but there may be two independent sources: a first pressure source 83I and a second pressure source 83II (not shown).

Here the arrangement is configured to pressurize the liquid 55 in the respective first and second upper and lower regulation lines 82IU, 82IL, 82IIU, 82IIL.

In this embodiment there is a common reservoir 84 configured to store the liquid 55 where at least one pressure source 83 and a common reservoir 84 are in liquid communication with respective first and second upper communication lines 50IU, 50IIU and each lower regulation line 82L is in liquid communication with respective first and second lower communication lines 50IL, 50IIL via the common distribution plate arrangement 90, which here has a set of canals with one-to-one canals 95 between the regulating lines 82 and the communication lines 50.

Figure 4:
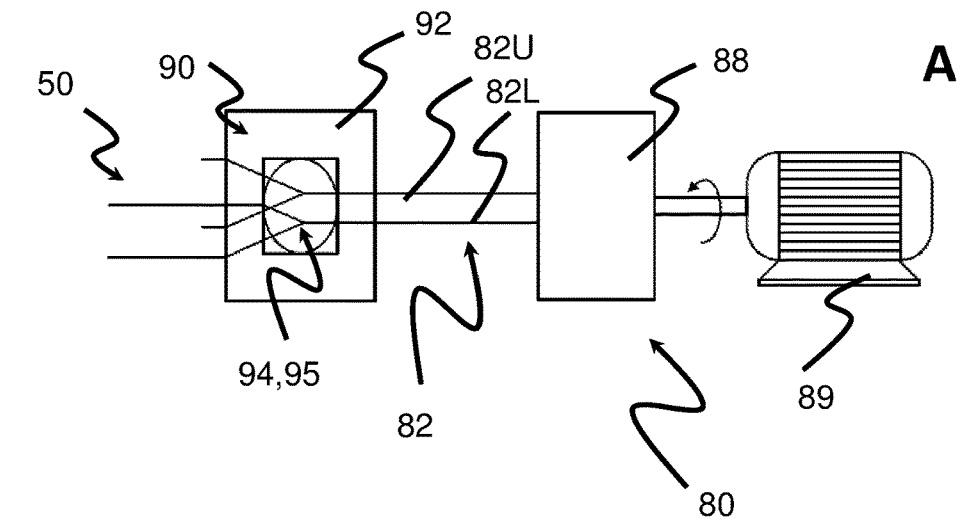
FIG. 4 illustrates embodiments of a control valve arrangement being a pump type of arrangement.
Figure 4:
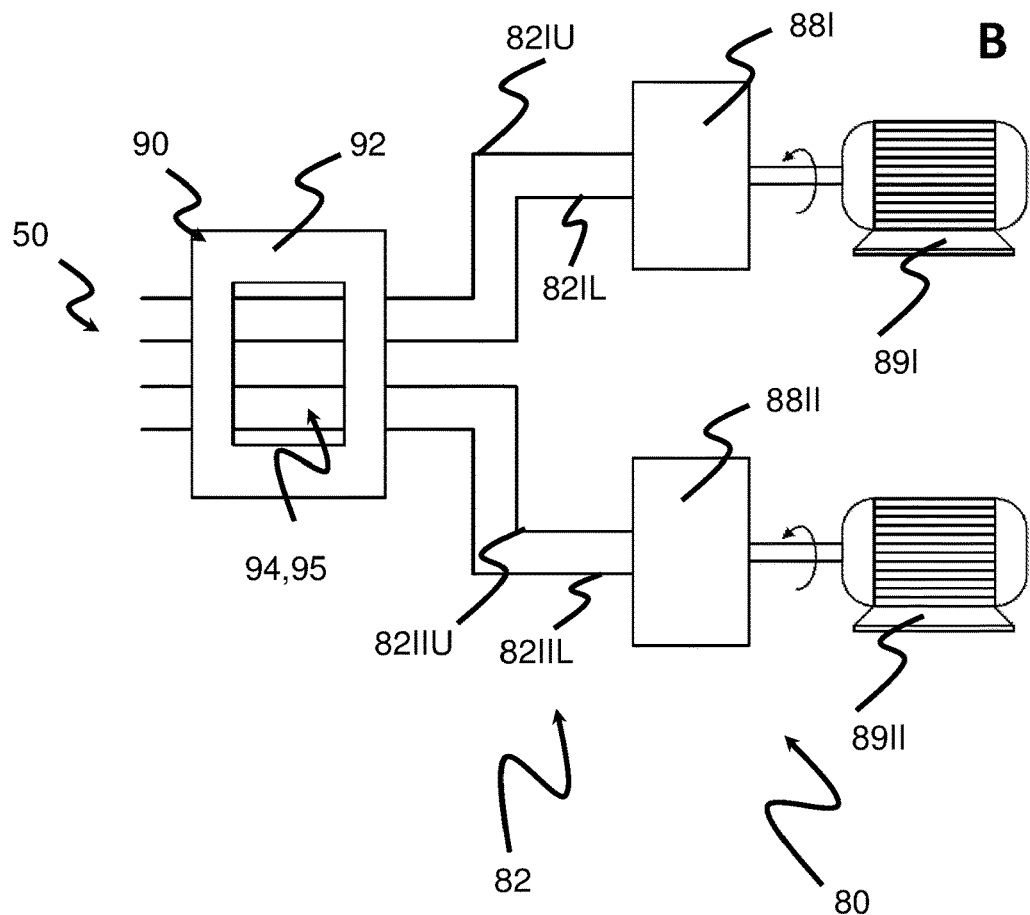

FIG. 4 illustrates embodiments of a control valve arrangement being a pump type of arrangement.

This regulator arrangement 80 comprises at least one pump 88 or a first pump 88I and second pump 88II configured to move liquid 55 between upper and lower regulation lines 82U, 82L.

Figure A shows an embodiment with a single pump 88 powered by a motor 89. The pump 88 regulates the flow of liquid 55 (not shown) in the upper regulation line 82U which is in liquid communication with the respective first and second upper communication lines 50IU, 50IIU. At the same time the pump 88 regulates the lower regulation line 82L, which is in liquid communication with respective first and second lower communication lines 50IL, 50IIL. The regulation lines 82 all go via the distribution plate arrangement 90 with a distribution plate 92 and a set of canals 94 with canals 95 as indicated.

Figure B shows an embodiment with a dual pump 88 configuration where each first and second pump 88I, 88II are powered by a first and second motor 89I, 89II. Each first and second pump 88I, 88II regulates the flow of liquid 55 (not shown) in the respective first and second upper regulation lines 82IU, 82IL, 82IIU, 82IIL that are in liquid communication with the respective first and second upper communication lines 50IU, 50IIU, 50IL, 50IIL. The regulation lines 82 all go via the distribution plate arrangement 90 with a distribution plate 92 and a set of canals 94 with canals 95 as indicated in a one-to-one manner.

Figure 5:
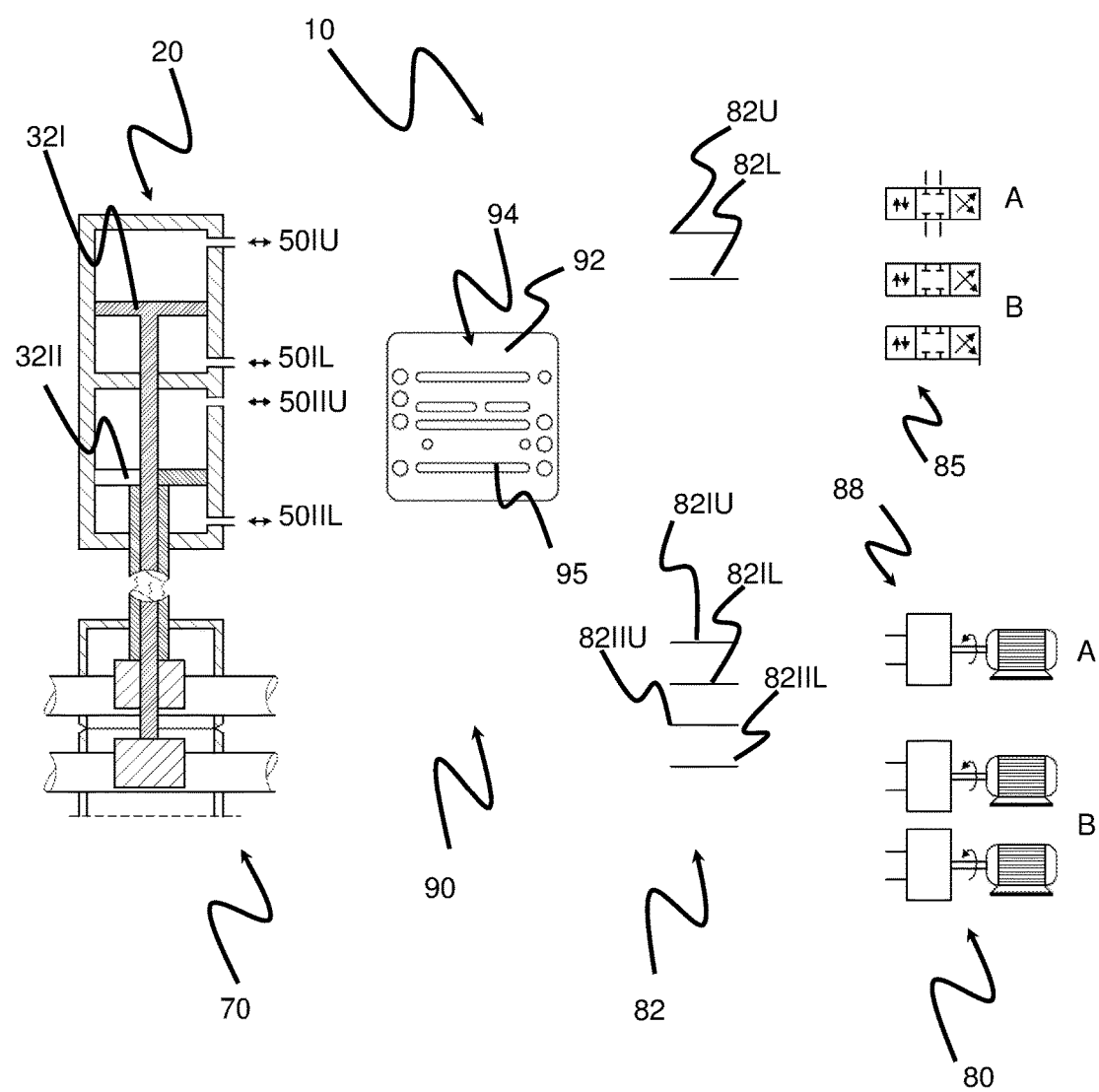
FIG. 5 illustrates an embodiment of a valve system with dual valve arrangement, an actuator arrangement, a distribution plate, regulation lines and communication lines, and optional control valve arrangements.

FIG. 5 illustrates an embodiment of a valve system with dual valve arrangement, an actuator arrangement, a distribution plate, regulation lines and communication lines, and optional control valve arrangements.

The figure shows features of a sanitary valve system 10 comprising an actuator arrangement 20 in and connected to respective first and second upper and lower liquid communication lines 50IU, 50IL, 50IIU, 50IIL communicating an incompressible liquid 55 (not shown) to respective first and second upper and lower cavities for moving or locking the respective first and second pistons 32I, 32II that are interconnected and independently operable. The pistons 32 are connected to valve arrangement 70 comprising a first valve 72I operably connected to the first piston shaft and a second valve 72 operably connected to the second piston shaft.

Here at least one liquid regulator arrangement 80 is configured to regulate pressure or flow of the incompressible liquid 55 in at least one set of upper and lower regulation lines 82U, 82L communicating with the respective first and second upper and lower cavities via the respective first and second upper and lower communication lines 50IU, 50IL, 50IIU, 50IIL

The regulator arrangement 80 may be a control valve arrangement 85 with one (A) control valve such as a directional valve 86 or there may be two (B) control valves 85. The regulator arrangement 80 may be a pump 88 type and there may either be a one-pump (A) or a two-pump (B) 88 configuration. Accordingly there may be a set of regulation lines 82 with an upper regulation line 82U and a lower regulation line 82L for the one (A) regulator configuration. There may be a dual set of regulation lines 82IU, 82IL, 82IIU, 82IIL for the two (B) regulator configurations. Details may be seen in FIG. 4.

The sanitary valve system 10 has a single common distribution plate arrangement 90 with least one common distribution plate 92 with a set of canals 94 configured to connect at least one set of upper and lower regulation lines 82U, 82L (or 82IU, 82IL, 82IIU, 82IIL) with the respective first and second upper and lower communication lines 50IU, 50IL, 50IIU, 50IIL.

Figure 6:
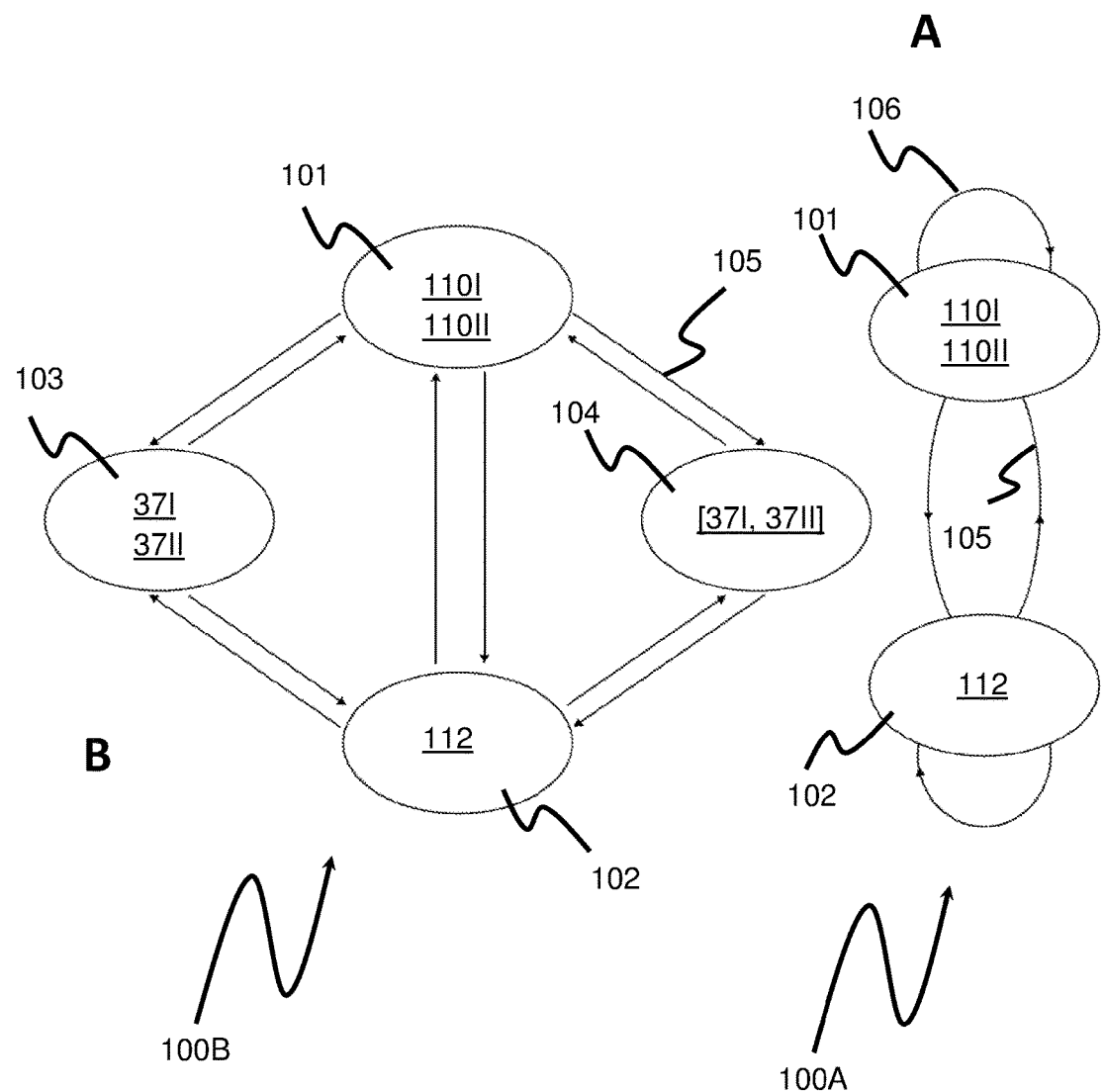
FIG. 6 illustrates operational states and transitions between operational states: A) a first state and a second state; and B) a first, a second, a third, and a fourth state.

FIG. 6 illustrates operational states and transitions between operational states: A) a first state and a second state; and B) a first, a second, a third, and a fourth state. Figure A shows an embodiment where the valve system is configured to operate in multiple states 100A comprising a first state 101 and a second state 102.

In the first state 101 of operation the respective first and second pistons are operated independently of each other according to respective first and second functions (110I, 110II).

In a second state 102 of operation the first and second pistons are operated jointly according to a joint function 112.

The valve system may perform transitions 105 amongst the respective states. Likewise the valve system may perform a transition within the same state, a self-transition 106, which may be a change from one set of functions 110IA to another set of functions 110IB. Similarly the valve system may change from one joint function 112A to another joint function 112B.

The functions 110, 112 may be according to logic implemented in a computer program or a controller operatively connected to the regulator arrangement.

The functions may be adjusted from an ideal functionality by an additional layer determined by a calibration routine or a calibration table.

Figure B illustrates an embodiment of the operation of the multifunctional valve system with multiple states 100B where there are further states of operation.

There is a third state 103 where the respective first and second pistons are independently locked in respective first and second piston positions There is a fourth state 104 where first and second pistons are dependently locked in respective first and second piston positions 37I, 37II.

A transition 105 from one locked position 37A to another locked position 37B may be via first state 101 or a second state 102 to another locked position 37B.

Figure 7:
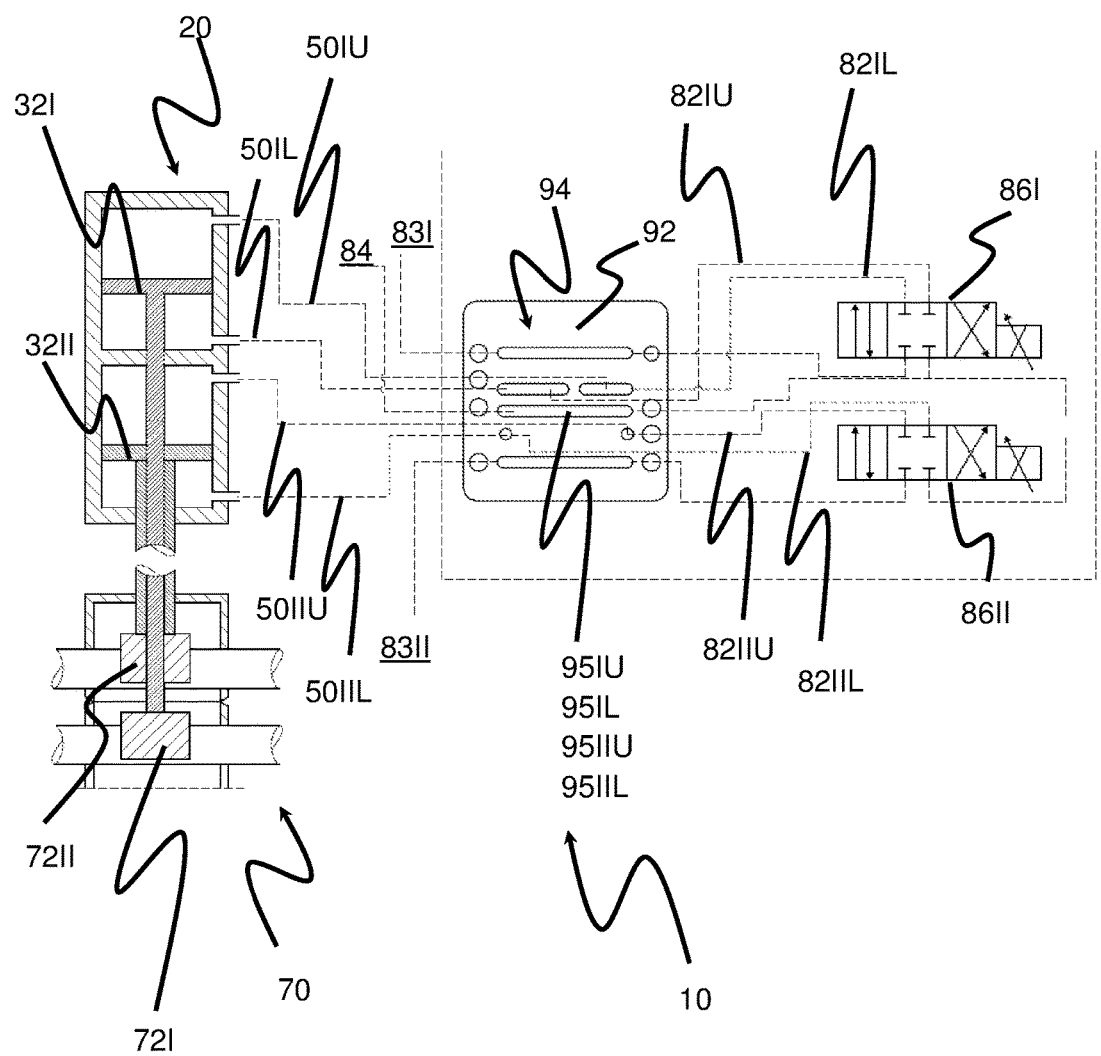
FIG. 7 illustrates an embodiment of a wiring of communication lines and regulation lines regulated by directional valves via a common distribution plate.

FIG. 7 illustrates an embodiment of a wiring of communication lines and regulation lines regulated by directional valves via a common distribution plate.

The figure shows a particular configuration and wiring of communications lines 50 and regulation lines 82 of a valve system 10. There is a first pressure source 83I, a second pressure source 83II, and a common reservoir 84 in liquid 55 (not shown) communication via a distribution plate 92 with a set of canals 94 with multiple canals 95 as shown to a regulator arrangement 80. The regulator arrangement 80 is in liquid communication 55 with the regulator plate 92 via regulation lines 82. The regulator arrangement 80 has a first and a second directional valve 86I, 86II that is configured to connect the pressure source lines and reservoir line to the respective first and second upper and lower regulator lines 82IU, 82IL, 82IIU, 82IIL as illustrated in FIG. 4B. The lines or wires and the canals are seen to be arranged to make the regulator lines 82IU, 82IL, 82IIU, 82IIL communicate with the respective communication lines 50IU, 50IL, 50IIU, 50IIL in a one-to-one manner via respective canals 95IU, 95IL, 95IIU, 95IIL (not shown for the sake of simplicity, but directly seen). Thereby the pressures in the respective cavities 34 (see FIG. 1 or 2) can be regulated so that the respective first and second piston 32I, 32II will move according to the regulated pressures so as to control the first and second valves 72I, 72II in the valve arrangement 70.

Thus all liquid communication lines communicate via the common distribution plate 92.

Figure 8:
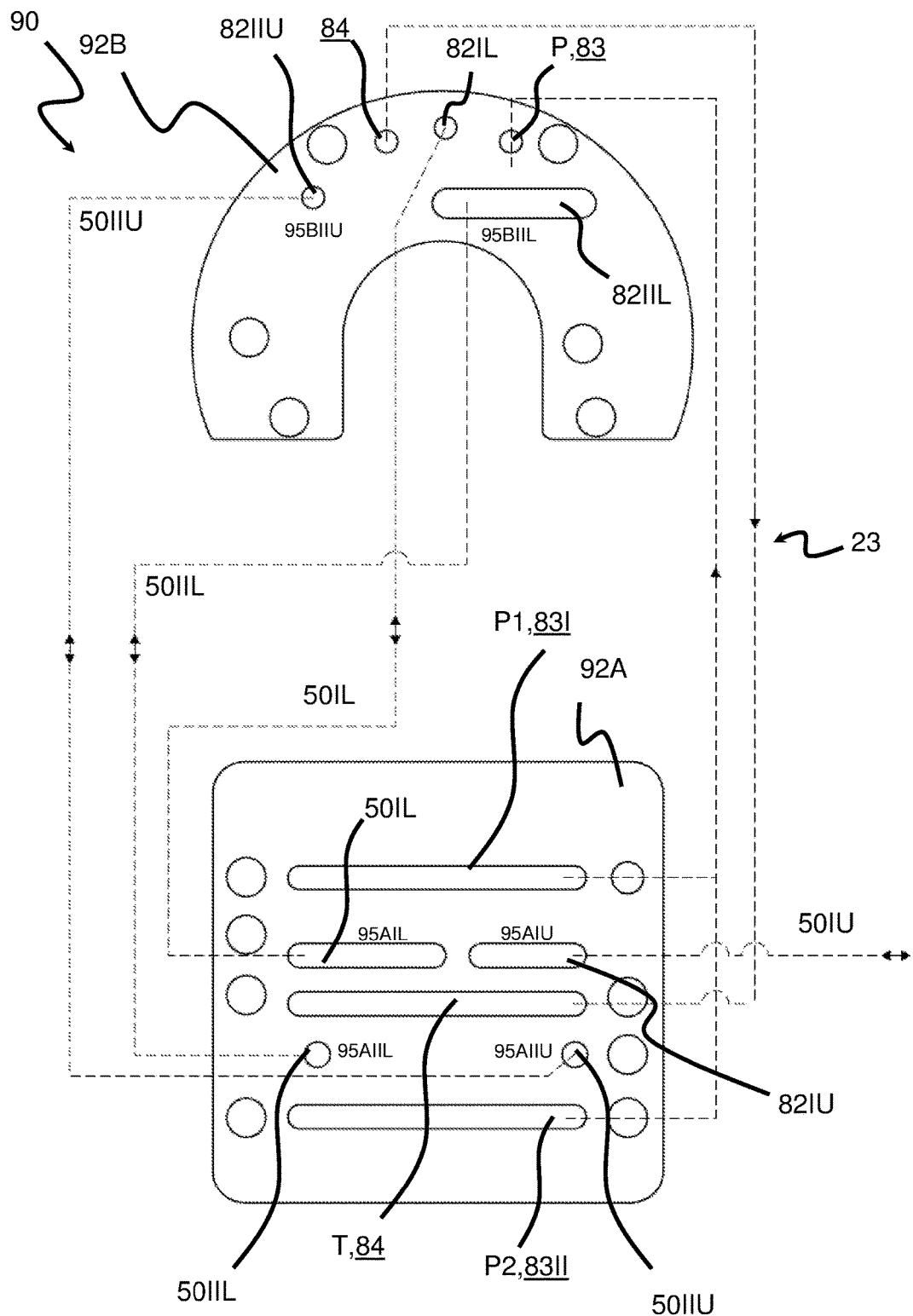
FIG. 8 illustrates an embodiment of a wiring of two distribution plates.
Figure 9:
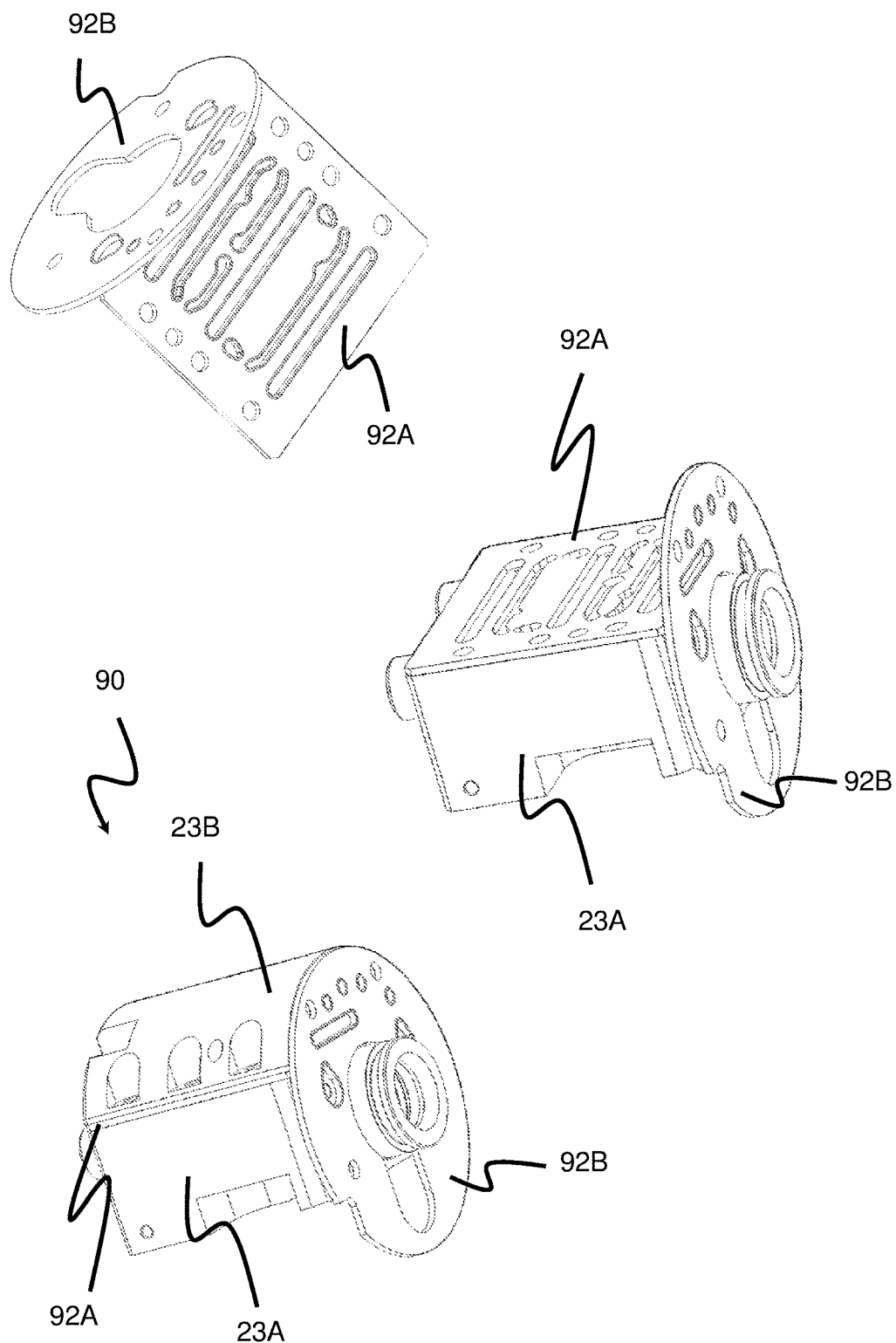
FIG. 9 illustrates an embodiment of two distribution plates in actuator block providing a very compact and accessible alternative to piping.

FIG. 8 illustrates an embodiment of a wiring of two distribution plates and may be seen in connection with FIG. 9 that illustrates an embodiment of two distribution plates in an actuator block providing a very compact and accessible alternative to piping.

FIGS. 8 and 9 show aspects of a distributor arrangement 90.

FIG. 8 shows a first distribution plate 92A and a second distribution plate 92B. Each plate has canals 95 which are here marked or numbered and being a respective first or second and respective upper and lower communication lines as done in FIG. 7. Hence the canal 95AIIL communicates with the second lower communication line 50IIL and so forth.

The two distribution plates 92A, 92B are assembled and arranged with one or more actuator housing blocks 23 such as an inner actuator block 23A and outer actuator block 23B as illustrated in FIG. 9.

The actuator block has liquid communications or canals such as illustrated in FIG. 8.

Thus the actuator block 23 with the distribution plates 92A, 92B forms a very compact distribution arrangement 90 where the first distribution plate 92A can be fitted to the actuator hosing, here via an interface on the inner actuator block 23A. Likewise the face of the second distribution plate 92B can be fitted to the actuator housing.

The arrangement illustrates the aspect that regulator lines 82 coming from the "top" into a cross-section of the valve system are distributed longitudinally of the valve system to communication lines 50. Sources and sinks such as one or more pressure sources 83 (83I, 83II) and the reservoir 84 may likewise be coming from one or more longitudinal positions and may be distributed to the regulator arrangement.

In this particular case there is a common pressure source 83, but the valve system may be prepared and otherwise configured for two pressure sources, but the functionality to work with only one pressure source is determined by the distribution arrangement 90 configuration.

Figure 10:
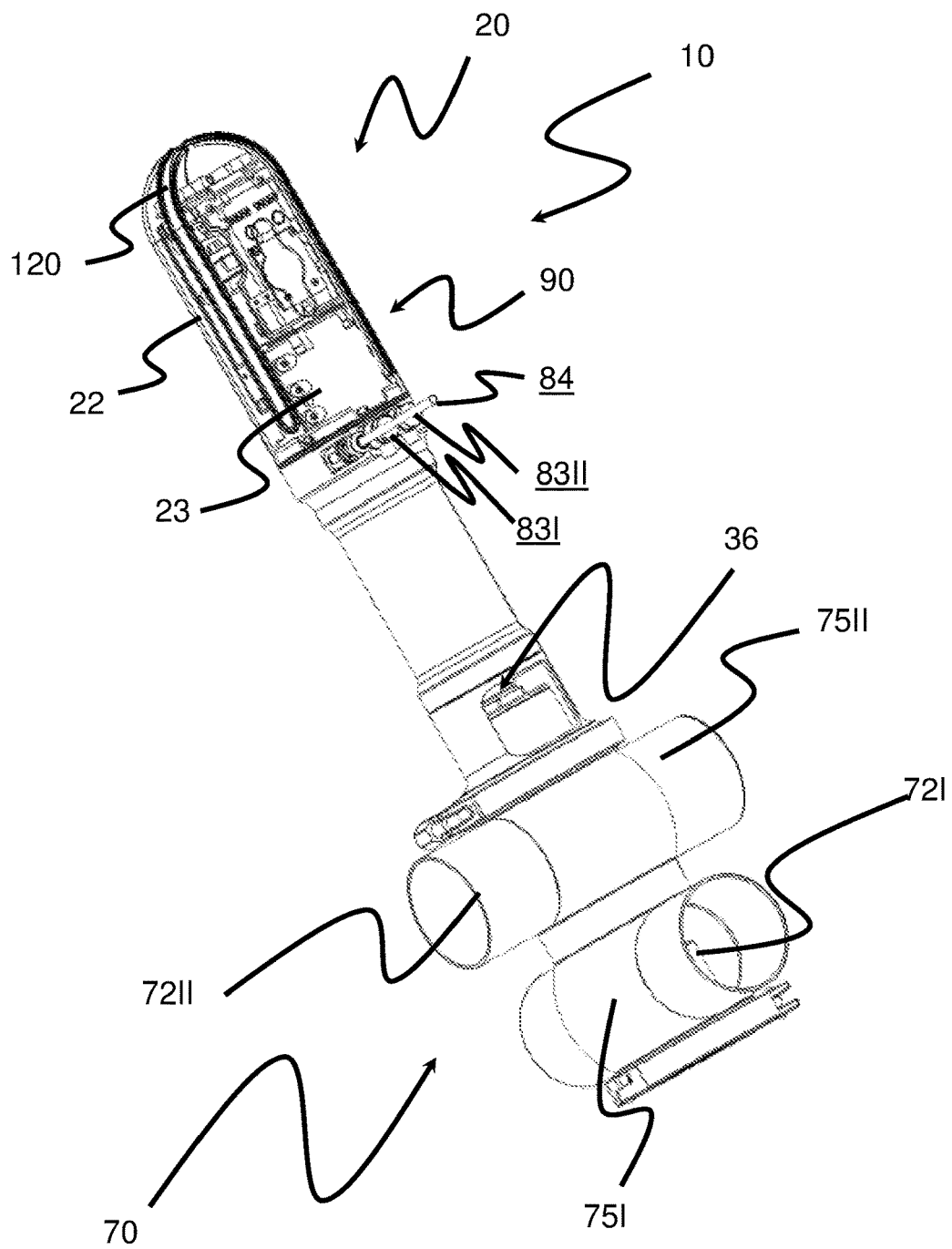
FIG. 10 illustrates a complete sanitary valve system with dual valve control.

FIG. 10 illustrates a complete sanitary valve system with dual valve control.

The sanitary valve system 10 has a valve arrangement 79 with a first valve 72I regulating a flow in a first flow line 75I and a second valve 72II regulating a flow in a second flow line 75II. The valves 72 are operated via respective piston shafts 36 attached to pistons (not shown) in the actuator housing 22.

In this embodiment the pistons are controlled by regulating pressures via first and second pressure sources 83I, 83II to be attached. There is also provided for a common reservoir 84.

The common distribution arrangement 90 is easily accessible via the demountable actuator block 23.

The sanitary valve system 10 has a visual indicator 120 arranged visually on the sanitary valve system 10 and configured to display distinct colours according to the actual state of operation and/or transition between states 105.

Figure 11:
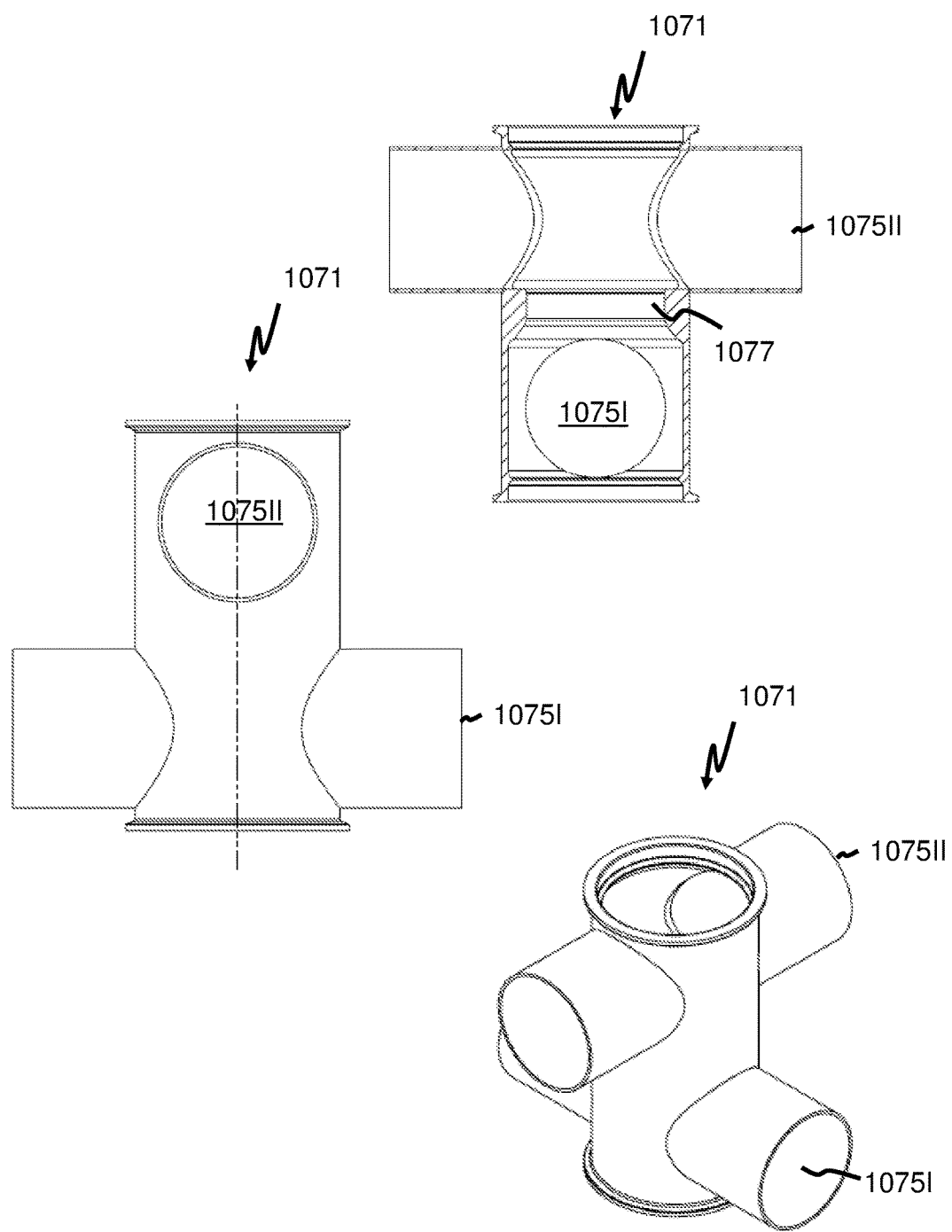
FIG. 11 illustrates different perspectives of a valve housing.

FIG. 11 illustrates different perspectives of a valve housing 1071 with a first flow line 1075I and a second flow line 1075II. There is a flow line communication 1077 between the first and second flow lines 1075I, 1075II. The valve housing 1071 is for a valve kit 1000 fitting to be illustrated in the following figures.

Figure 12:
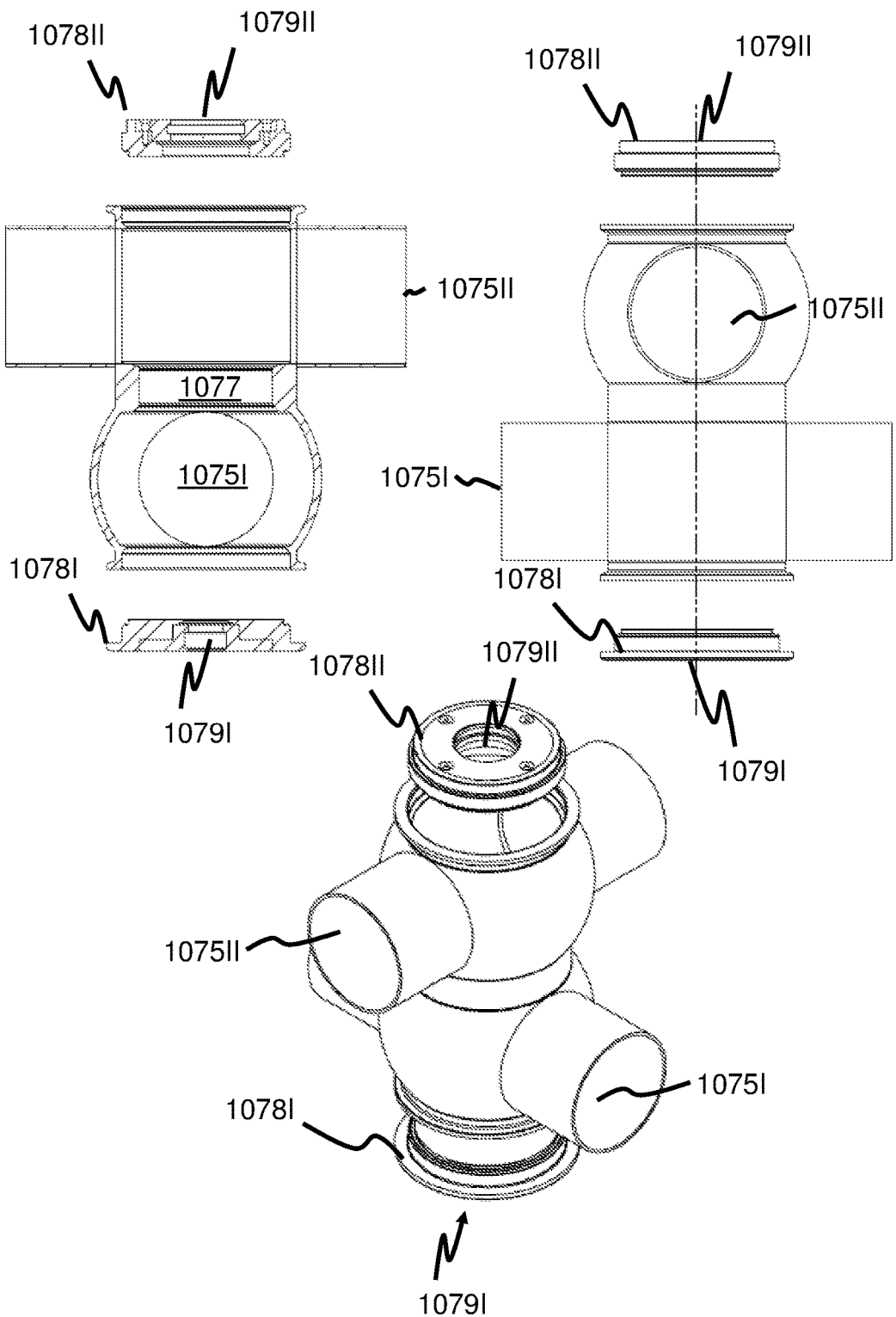
FIG. 12 illustrates different perspectives of a housing seal.

FIG. 12 illustrates different perspectives of a housing seal 1078 for a valve housing 1071. There is a first housing seal 1078I with a first seal aperture 1079I. There is a second housing seal 1078II with a second seal aperture 1079II. The seal apertures 1079I, 1079II have complementary shapes to respective piston shafts 1036I, 1036II to be illustrated in the following figures.

Figure 13:
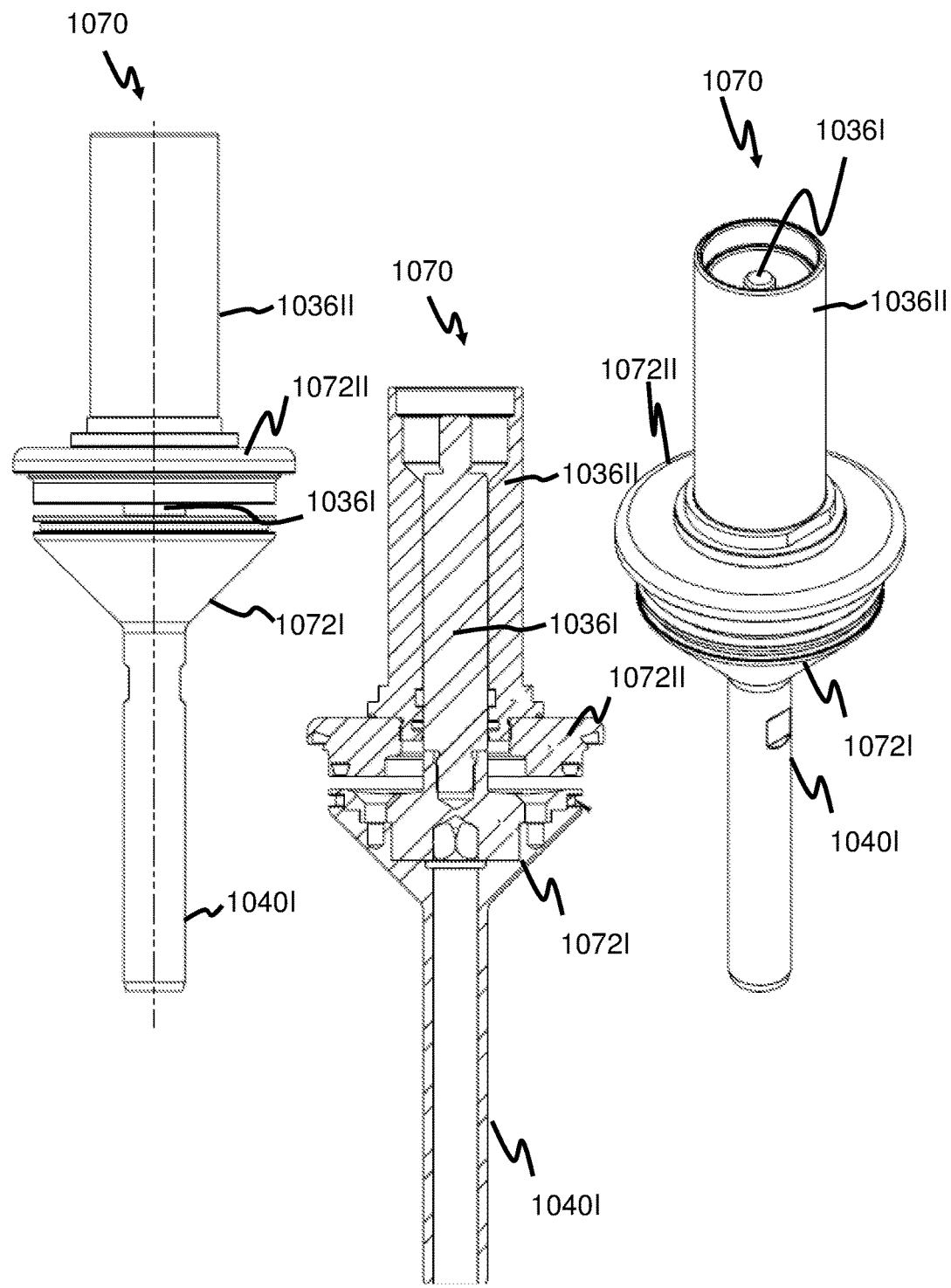
FIG. 13 illustrates different perspectives of a valve arrangement.

FIG. 13 illustrates different perspectives of a valve arrangement 1070 for a valve housing 1071 (not shown). The valve arrangement 1070 has a first valve 1072I with a first valve seat 1073I interacting with a first piston shaft 1036I. There is a second valve 1072II with a second valve seat 1073II interacting with a second piston shaft 1036II.

Figure 14:
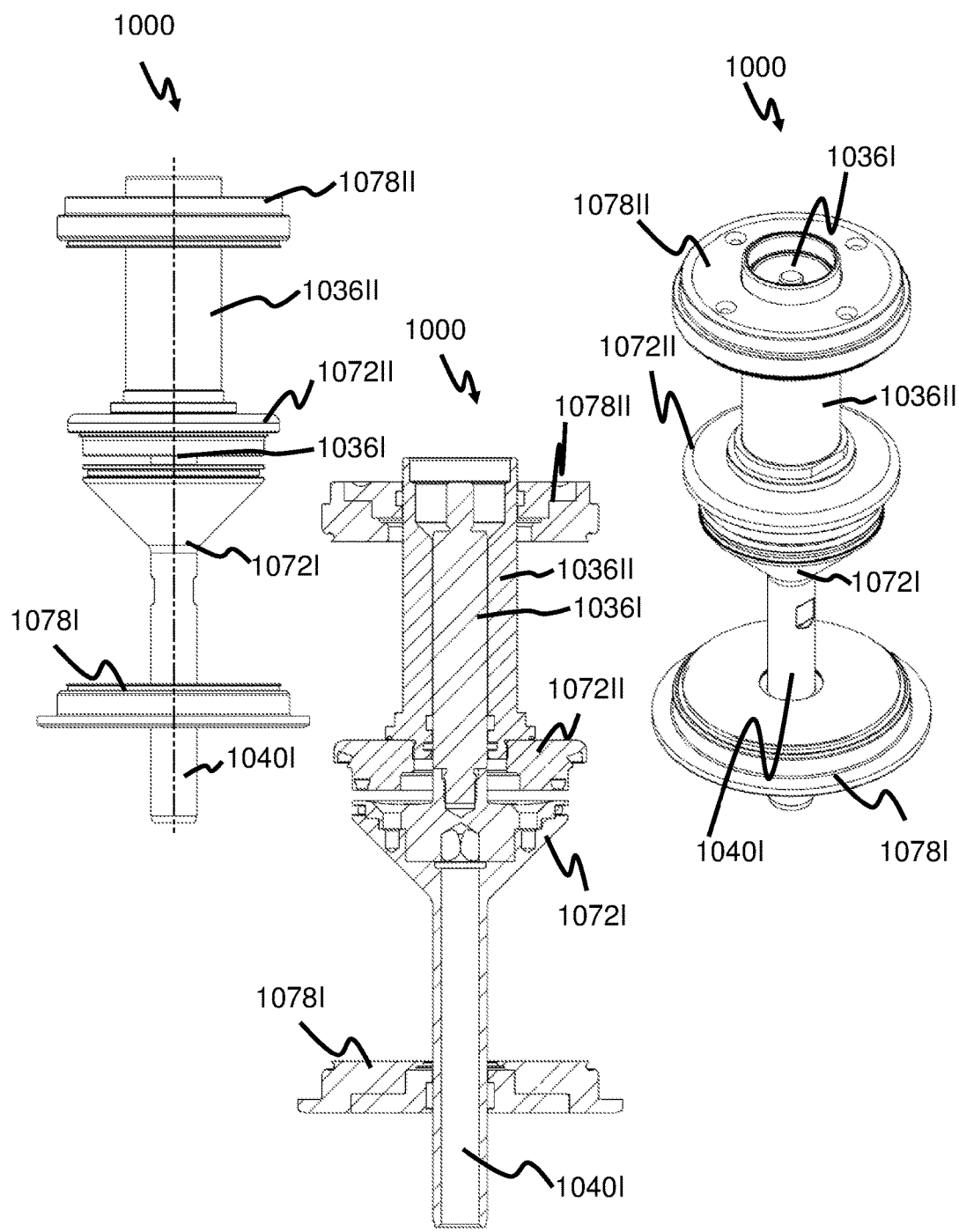
FIG. 14 illustrates different perspectives of a sanitary valve kit.

FIG. 14 illustrates different perspectives of a sanitary valve kit 1000 as assembled without the valve housing 1071 (not shown). The valve kit 1000 has a first valve 1072I operably connected to the first piston shaft 1036I and a second valve 1072II operably connected to the second piston shaft 1036II and wherein the respective first and second piston shafts 1036I, 1036II being interconnected and independently operable.

The first and second valves 1072I, 1072II arranged relatively to each other and to be independently operable when assembled in the valve housing 1071 (not shown) and interacting in a first housing seal 1078I with a first seal aperture 1079I adapted to allow guidance of the second piston shaft (1036II); a second housing seal 1078II with a second seal aperture 1079II adapted to allow guidance of a first piston shaft extension 1040I.

Figure 15:
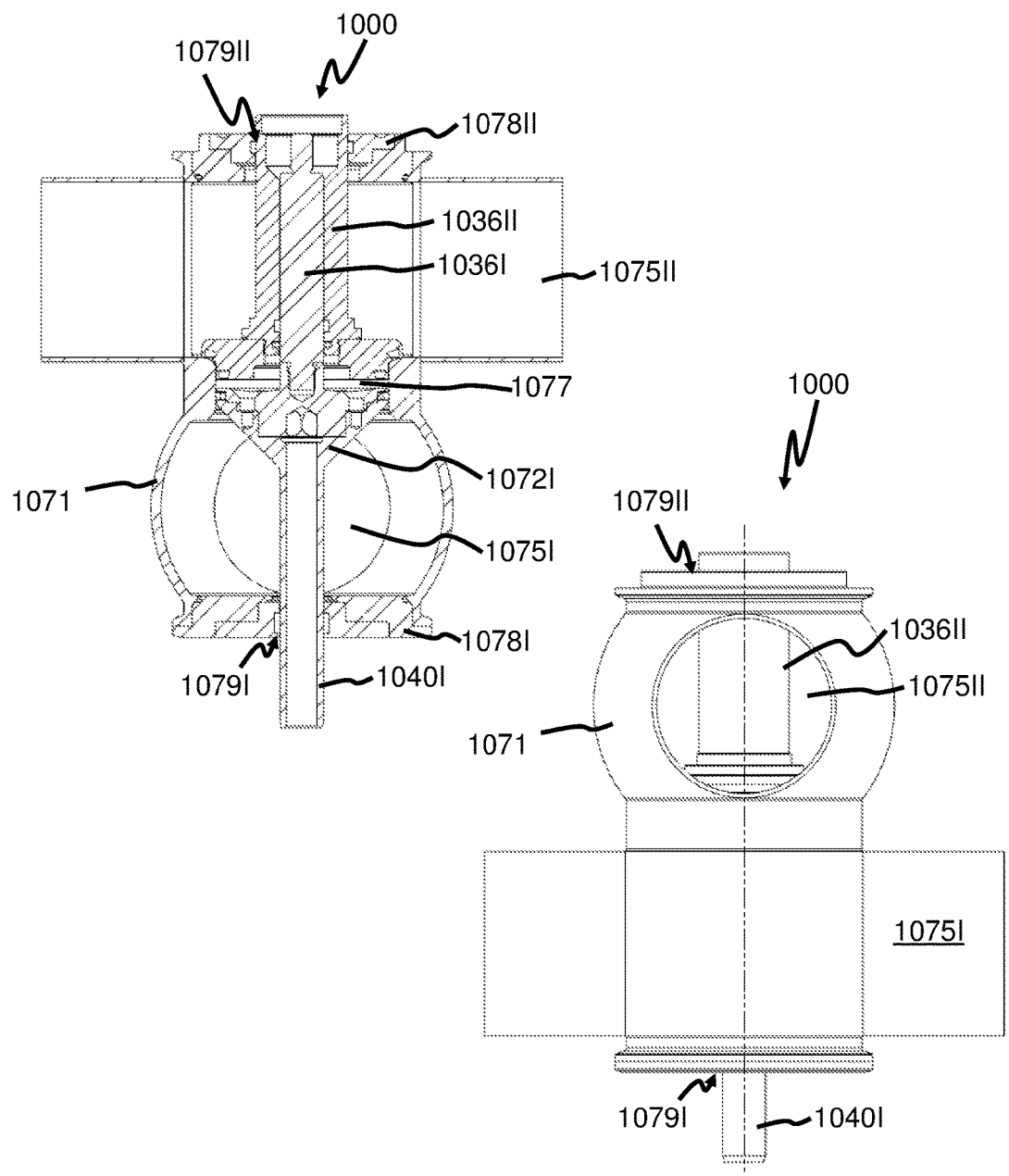
FIG. 15 illustrated different perspectives of a sanitary valve kit assembled in a valve housing.

FIG. 15 illustrated different perspectives of a sanitary valve kit 1000 assembled in a valve housing 1071.

The first and second piston shafts 1036I, 1036II are available for connection and operation with an actuator 20 (not shown). The first piston shaft extension 1040I is operable in the first seal aperture 1079I and outside.

FIGS. 11 to 15 also illustrates a method of retrofitting an existing valve arrangement by establishing access to a valve housing 1071 (FIG. 11).

Arranging (FIGS. 12 to 15) in the valve housing 1071 a first valve 1072I operably connected to the first piston shaft 1036I and a second valve 1072II operably connected to the second piston shaft 1036II. Sealing (FIGS. 12 to 15) the valve housing 1071 by using a first and second housing seals 1078I, 1078II.

Figure 16:
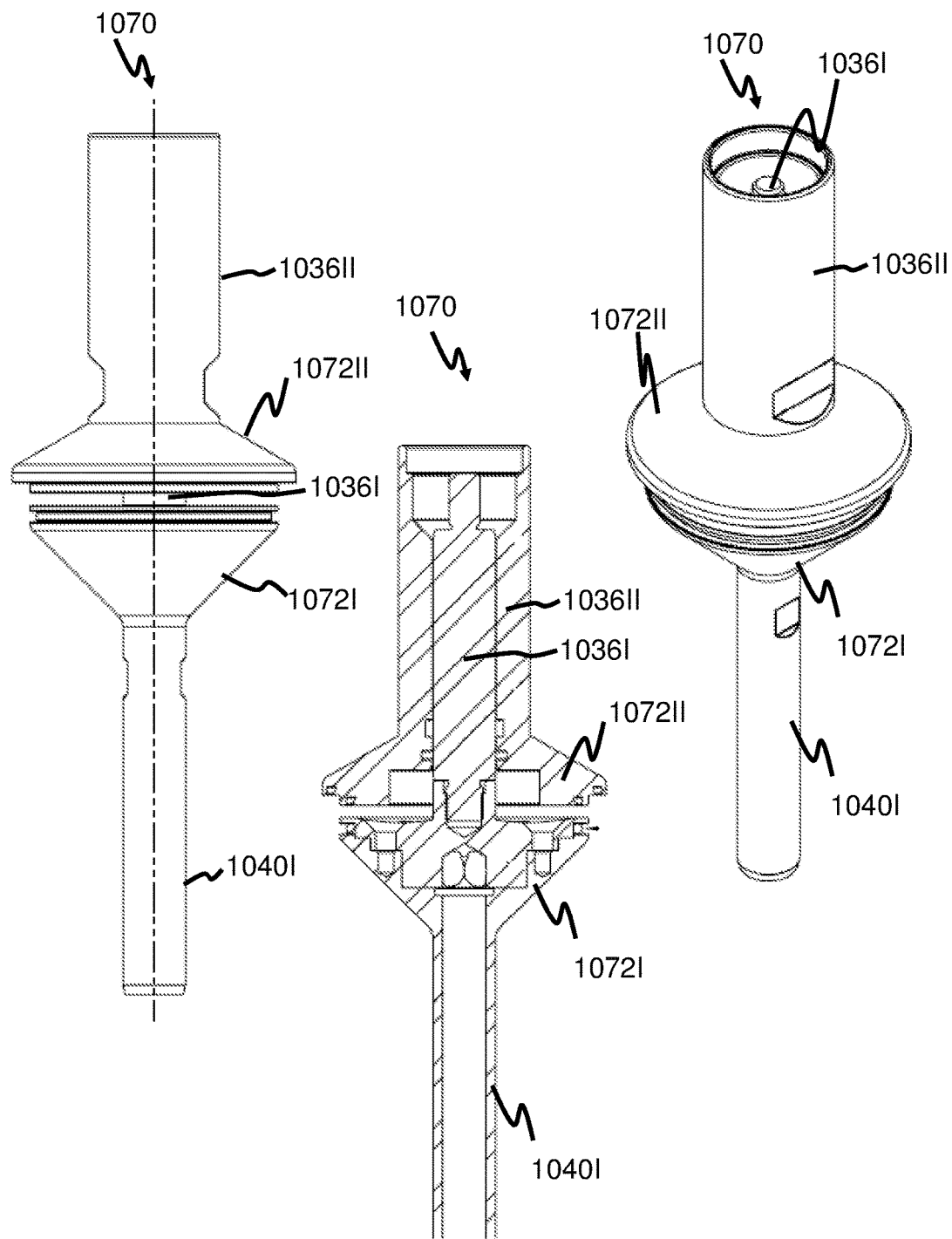
FIG. 16 illustrates a different embodiment of the valve arrangement.

FIG. 16 illustrates a different embodiment of the valve arrangement 1070 shown in FIG. 13.

The invention claimed is:
1. A sanitary valve system comprising:
an actuator arrangement in an actuator housing comprising
a first piston chamber with a first piston separating the first piston chamber in a first upper cavity and a first lower cavity and having a first piston shaft configured to operate outside of the actuator housing;

a second piston chamber with a second piston separating the second piston chamber in a second upper cavity and a second lower cavity and having a second piston shaft configured to operate outside of the actuator housing;

respective first and second upper and lower liquid communication lines communicating an incompressible liquid to respective first and second upper and lower cavities for moving or locking the respective first and second pistons;

the respective first and second pistons being interconnected and independently operable;

a valve arrangement comprising a first valve operably connected to the first piston shaft and a second valve operably connected to the second piston shaft;

at least one liquid regulator arrangement configured to regulate pressure or flow of the incompressible liquid in at least one set of upper and lower regulation lines communicating with the respective first and second upper and lower cavities via the respective first and second upper and lower communication lines via a common distribution plate arrangement wherein being configured to operate in multiple states comprising a first state where each respective first and second pistons are operated independently of each other according to respective first and second functions;

a second state where the first and second pistons are operated jointly according to a joint function and where each state and transitions amongst states are controlled by regulating the liquid pressure or flow in each respective first and second upper and lower cavities via the common distribution plate arrangement with least one common distribution plate with a set of canals configured to connect at least one set of upper and lower regulation lines with the respective first and second upper and communication lines.

2. The sanitary valve system according to claim 1, further comprising
a third state where the respective first and second pistons are independently locked in respective first and second piston positions; and
a fourth state where first and second pistons are dependently locked in respective first and second piston positions.

3. The sanitary valve system according to claim 1, wherein the set of canals are formed and arranged to communicate with regulation lines and/or communication lines at least partially embedded in an actuator housing block.

4. The sanitary valve system according to claim 1, wherein having multiple distribution plates each plate with a set of canals and arranged so that a set of canals in one distribution plate is in liquid communication with a set of canals in another distribution plate via an actuator housing block and with one distribution plate essentially perpendicular to another regulation plate.

5. The sanitary valve system according to claim 1, wherein having a plurality of sets of canals in either a plurality of regulator plates or in a single regulator plate adapted to be mounted in different positions, each different position corresponding to a distinctive set of canals and where at least one canal in one set of canals has a different form or is blocked compared to another set of canals.

6. The sanitary valve system according to claim 1, wherein further comprising a visual indicator arranged visually on the sanitary valve system and configured to display distinct colours according to the actual state of operation and/or transition between states.

7. The sanitary valve system according to claim 1, wherein the first and second pistons share a cavity 34, such as the first lower cavity and the second upper cavity is the same cavity.

8. The sanitary valve system according to claim 1, wherein the regulator arrangement comprises at least one pressure source or a first pressure source and a second pressure source configured to pressurize the liquid in the respective upper and lower regulation lines, and a common reservoir configured to store the liquid where at least one pressure source and a common reservoir are in liquid communication via the common distribution plate arrangement with respective first and second control valves each being a directional valve having
a first position allowing liquid communication from the pressure source to upper regulation line and from lower regulation line to the common reservoir;
a second position blocking liquid communication between the pressure source and common reservoir and the upper and lower regulation lines, and
a third position allowing liquid communication from the pressure source to lower regulation line (82L) and from upper regulation line to the common reservoir (84),
each upper regulation line being in liquid communication with the respective first and second upper communication lines and each lower regulation line being in liquid communication with respective first and second lower communication lines via the common distribution plate arrangement.

9. The sanitary valve system according to claim 1, wherein the regulator arrangement comprises at least one pump or a first pump and a second pump configured to move liquid (55) between upper and lower regulation lines each upper regulation line being in liquid communication with the respective first and second upper communication lines and each lower regulation line being in liquid communication with respective first and second lower communication lines via the common distribution plate arrangement.

10. A method of operating a sanitary valve system with a valve arrangement comprising a first and a second valve operably connected to respective first and second pistons operating in a actuator housing where the respective pistons separate respective first and second piston chambers in an upper cavity and a lower cavity each with an incompressible liquid and with respective first and second upper and lower communication lines, where the method comprises actions of
regulating the position of pistons by changing the pressure or flow of the incompressible liquid in the respective upper and lower cavities or by moving incompressible liquid between the respective upper and lower cavities;
locking the positions of pistons by blocking the respective upper and lower communication lines;
wherein the actions of regulating and locking are performed in and amongst states of:
a first state where each respective first and second pistons are operated independently of each other according to respective first and second functions;
a second state where the first and second pistons are operated jointly according to a joint function.

11. The method of operating a sanitary valve system according to claim 10, wherein the actions of regulating and locking are performed in and amongst further states of:

a third state where the respective first and second pistons are independently locked in respective first and second positions;

a fourth state where first and second pistons are dependently locked in respective first and second positions.

12. The method of operating a sanitary valve system according to claim 10, where the actions of regulating and locking the positions of the pistons are performed
using a common distribution plate with a set of canals that connect respective first and second upper and lower communication lines with at least one set of upper and lower regulation lines.

13. The method 8 of operating a sanitary valve system according to claim 12, wherein the change of possible operational states, independent functions or joint functions are performed by changing one set of canals with another set of canals.

14. A sanitary valve kit to modify an existing valve arrangement having a valve housing with a first and a second flow line to operate with a actuator arrangement in multiple states, the sanitary valve kit comprising:
a first valve operably connected to the first piston shaft and a second valve operably connected to the second piston shaft and wherein the respective first and second piston shafts being interconnected and independently operable; and with the first and second valves arranged relatively to each other and to be independently operable when assembled in the valve housing; and
a first housing seal with a first seal aperture adapted to allow guidance of the second piston shaft; a second housing seal with a second seal aperture adapted to allow guidance of a first piston shaft extension.

15. The sanitary valve kit according to claim 14, and being configured to operate in a first state where each respective first and second valves are operated independently of each other according to respective first and second functions.

16. The sanitary valve kit according to claim 14, and being configured to operate in a second state where the first and second valves are operated jointly according to a joint function.

17. The sanitary valve kit according to claim 14, and being configured to operate in a third state where the respective first and second valves are independently locked in respective first and second valve positions; and in a fourth state where the respective first and second valves are dependently locked in respective first and second valve positions.

18. The sanitary valve kit according to claim 14, wherein at least one of the first or second valves has a valve seat with a conical shape.

19. The sanitary valve kit according to claim 14, wherein the first and second piston shafts and the first piston shaft extension are arranged to operate coaxially.

20. The sanitary valve kit (1000) according to claim 14, wherein the first piston shaft extension is without balancing means.

21. The sanitary valve kit according to claim 14, wherein the first valve seat is unbalanced.

22. The sanitary valve kit according to claim 14, wherein the second valve seat is unbalanced.

23. The sanitary valve kit according to claim 14, wherein both the first and second valve seats are unbalanced, and wherein the first piston shaft extension has a free end shape with a cross section complementary to the first seal aperture.

24. A method of retrofitting an existing valve arrangement to operate with an actuator arrangement in multiple states, the method comprising the steps of:
establishing an existing valve arrangement with access to a valve housing;
providing an actuator arrangement with the respective first and second pistons being interconnected and independently operable;
arranging in the valve housing a first valve operably connected to the first piston shaft and a second valve operably connected to the second piston shaft;
sealing the valve housing by using a first and second housing seals.

* * * * *

UNITED STATES PATENT AND TRADEMARK OFFICE
CERTIFICATE OF CORRECTION

| | | |
|---|---|---|
| PATENT NO. | : 10,422,439 B2 | Page 1 of 1 |
| APPLICATION NO. | : 15/774880 | |
| DATED | : September 24, 2019 | |
| INVENTOR(S) | : Peter Espersen | |

It is certified that error appears in the above-identified patent and that said Letters Patent is hereby corrected as shown below:

On the Title Page

Item (73) under Assignee please delete "Kmatic ApS" and insert -- Hydract ApS --

Signed and Sealed this
Fifth Day of May, 2020

Andrei Iancu
*Director of the United States Patent and Trademark Office*